(12) United States Patent
Painter et al.

(10) Patent No.: US 10,704,353 B2
(45) Date of Patent: Jul. 7, 2020

(54) MODULAR ELECTRICAL FEEDTHROUGH

(71) Applicant: Teledyne Instruments, Inc., Thousand Oaks, CA (US)

(72) Inventors: David A Painter, Daytona Beach, FL (US); Brandon M Watson, Palm Coast, FL (US); Alexander D Socha, Longwood, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 278 days.

(21) Appl. No.: 14/979,296

(22) Filed: Dec. 22, 2015

(65) Prior Publication Data
US 2017/0175476 A1    Jun. 22, 2017

(51) Int. Cl.
*E21B 33/038* (2006.01)
*H01R 13/52* (2006.01)
*H01R 13/533* (2006.01)
*H01R 13/523* (2006.01)
*H01R 13/631* (2006.01)
*H01R 105/00* (2006.01)
*H02G 3/22* (2006.01)
(Continued)

(52) U.S. Cl.
CPC ....... *E21B 33/0385* (2013.01); *H01R 13/523* (2013.01); *H01R 13/5205* (2013.01); *H01R 13/533* (2013.01); *H01R 13/631* (2013.01); *E21B 17/028* (2013.01); *E21B 43/128* (2013.01); *H01R 13/521* (2013.01); *H01R 2105/00* (2013.01); *H01R 2201/20* (2013.01); *H02G 3/22* (2013.01); *H02G 15/14* (2013.01)

(58) Field of Classification Search
CPC .... E21B 33/038; E21B 33/0385; H01R 13/52
See application file for complete search history.

(56) References Cited

U.S. PATENT DOCUMENTS 3,998,515 A    12/1976 Panek
4,096,983 A     6/1978 Beilein et al.
(Continued)

FOREIGN PATENT DOCUMENTS

EP    2413435 A1    2/2012
EP    2624369 A1    8/2013
(Continued)

*Primary Examiner* — David J Bagnell
*Assistant Examiner* — Manuel C Portocarrero
(74) *Attorney, Agent, or Firm* — Duncan Galloway Egan Greenwald, PLLC; Kevin T. Duncan

(57) ABSTRACT

The present invention provides a modular electrical feedthrough system for use in offshore and top-side electrical submersible pump ("ESP") installations. A modular electrical connection system includes a stab receptacle assembly for mating with a stab plug assembly and a compliance mount. The stab plug assembly includes stab plugs and guide funnels adapted to guide the stab receptacles into a mating position with the stab plugs. The compliance mount compensates for physical misalignment between stab receptacles and stab plugs. A tubing hanger assembly forms a pressure barrier at a production bore by use of a tubing hanger penetrator assembly including a set of seals to isolate the electrical penetrator from the production bore. A secondary penetrator assembly provides a redundant pressure barrier for increased safety and system reliability.

19 Claims, 24 Drawing Sheets

(51) Int. Cl.
*H02G 15/14* (2006.01)
*E21B 17/02* (2006.01)
*E21B 43/12* (2006.01)

(56) References Cited

U.S. PATENT DOCUMENTS

| | | | |
|---|---|---|---|
| 4,525,013 A | 6/1985 | Phillips | |
| 4,598,290 A | 7/1986 | Collins | |
| 5,588,086 A | 12/1996 | Fan | |
| 5,626,190 A | 5/1997 | Moore | |
| 5,642,780 A | 7/1997 | Moore | |
| 5,823,256 A | 10/1998 | Moore | |
| 6,506,083 B1 | 1/2003 | Bickford | |
| 6,530,433 B2 | 3/2003 | Smith | |
| 7,955,105 B2 | 6/2011 | Maeland | |
| 7,959,454 B2 | 6/2011 | Ramasubramanian | |
| 8,097,810 B2 | 1/2012 | Benestad | |
| 8,123,549 B2 | 2/2012 | Jazowski | |
| 8,287,295 B2 | 10/2012 | Sivik | |
| 8,303,312 B2 | 11/2012 | Raad | |
| 8,946,552 B2 | 2/2015 | Li | |
| 8,968,018 B2 | 3/2015 | Sivik | |
| 9,388,643 B1* | 7/2016 | McCleary | H02G 15/14 |
| 2005/0020133 A1* | 1/2005 | Homann | H01R 13/6675 |
| | | | 439/606 |
| 2006/0079107 A1 | 4/2006 | Allensworth | |
| 2006/0172586 A1* | 8/2006 | Rosenblatt | H01R 4/2404 |
| | | | 439/425 |
| 2008/0087466 A1* | 4/2008 | Emerson | H01R 13/5216 |
| | | | 174/88 R |
| 2009/0114302 A1 | 5/2009 | Yeazel et al. | |
| 2010/0206577 A1* | 8/2010 | Martinez | E21B 23/14 |
| | | | 166/369 |
| 2010/0329893 A1* | 12/2010 | Martinez | E21B 43/128 |
| | | | 417/53 |
| 2011/0021049 A1 | 1/2011 | Ramasubramanian et al. | |
| 2012/0100737 A1* | 4/2012 | Frey | H01R 13/523 |
| | | | 439/271 |
| 2013/0044983 A1* | 2/2013 | Nagengast | E21B 33/0385 |
| | | | 385/77 |
| 2013/0183853 A1 | 7/2013 | Sivik et al. | |
| 2013/0235537 A1* | 9/2013 | Swett | E21B 47/011 |
| | | | 361/752 |
| 2014/0112699 A1 | 4/2014 | Lewkoski | |
| 2014/0335712 A1 | 11/2014 | Semple | |

FOREIGN PATENT DOCUMENTS

| | | |
|---|---|---|
| GB | 2519943 A | 5/2015 |
| WO | 2009134141 A1 | 11/2009 |

* cited by examiner

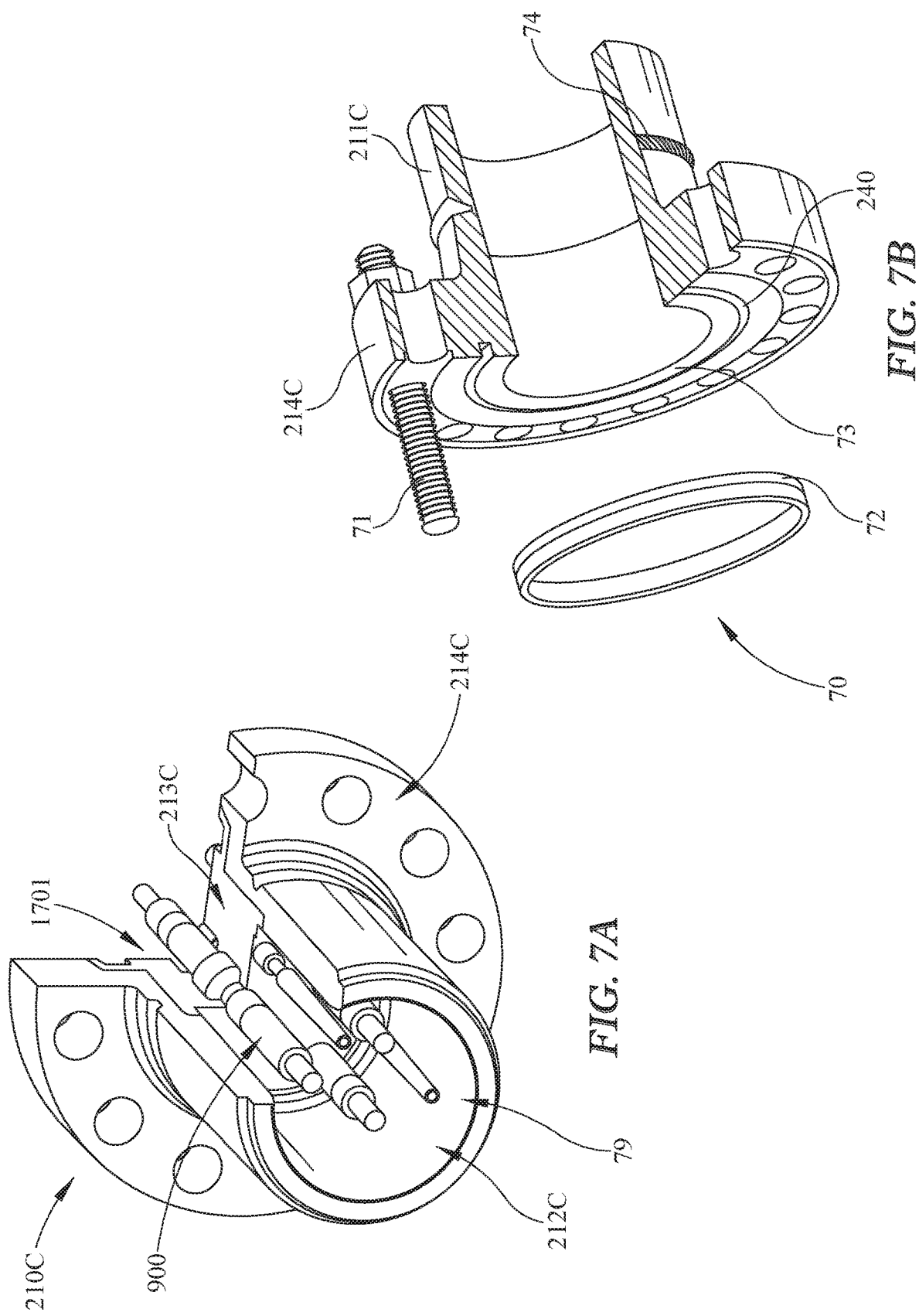

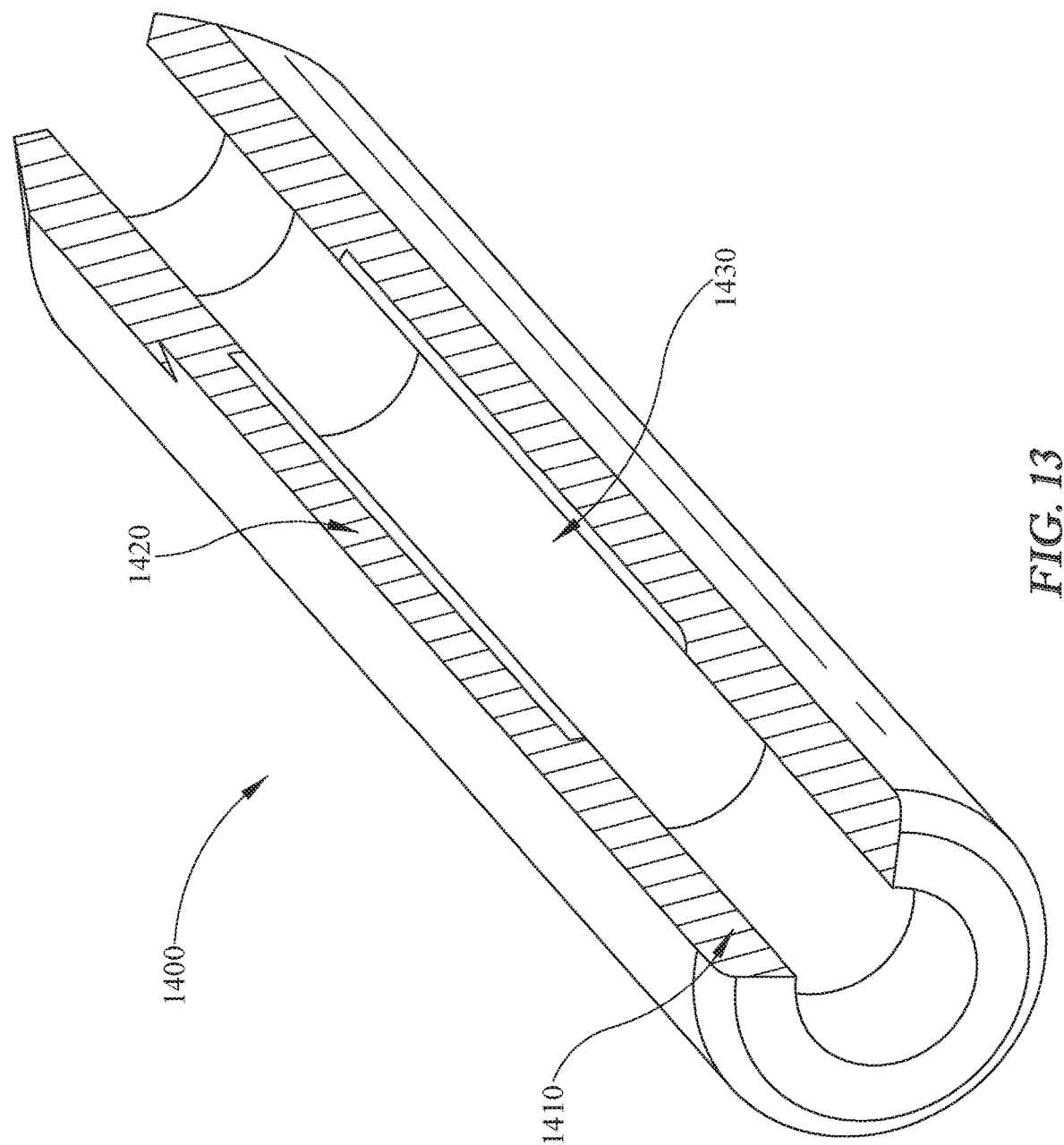

MODULAR ELECTRICAL FEEDTHROUGH

CROSS-REFERENCE TO RELATED APPLICATIONS

The present invention is related to co-pending application U.S. patent application Ser. No. 14/979,269, entitled FIRE-RESISTANT ELECTRICAL FEEDTHROUGH (Painter et al.), which is incorporated by reference herein in its entirety.

FIELD OF THE INVENTION

The present invention relates to offshore and terrestrial power feedthrough systems for electrical submersible pump ("ESP") installations. More specifically, the present invention relates to a modular electrical feedthrough comprising a set of bulkhead penetrators, sealing elements, and cable terminations.

BACKGROUND

In subsea production, electrically operated apparatuses below sea level are typically supplied by power from sea- or land-based host facilities. The power is provided from the external sources to the subsea devices via cable conductors to submerged process control equipment, pumps and compressors, transformers, motors, and other electrically operated equipment. As these components are disposed subsea and are typically enclosed and protected by water-proof pressure vessels, power is provided by means of a cable termination and connector, which may be an electrical penetrator, designed to penetrate and provide power through a bulkhead.

In existing penetrator assemblies, the conductor pin of the penetrator is embedded in an insulator body, which may be seated in a penetrator housing and is sealed against the penetrator housing by means of O-rings, or other types of seals. In downhole applications the electrical penetrator must protect against the egress of production media. At operational pressures at and above several thousand psi the penetrator is subjected to immense differential pressure. This pressure requires a penetrator structure that is adapted to operate despite high differential pressures across seals over a wide range of operating temperatures.

In one embodiment an electrical penetrator may be used to power subsea electric submersible pump (ESP) equipment and the like which pump hydrocarbons in oil well installations, and also in other applications such as high pressure electrical penetrations and other penetrations to provide power to various types of subsea equipment. The penetrator extends through the wall or bulkhead of the vessel in which the equipment is located, and is normally connected to power cables at one end for connecting the equipment to an external power source. In an ESP application, the connection or penetrator cannot be isolated from the pumping pressure for practical reasons. This creates an extreme environment for the connector or penetrator in terms of pressure, temperature, chemical exposure, and high voltage. The penetrator must transfer power to the motor as well as maintain a pressure barrier for internal pressure created by the ESP. The temperatures seen at the reservoir may be increased due to injection fluid temperatures, processing, as well as resistive heating of the electrical elements. For certain topside applications, the penetrators must also be able to resist sustained intense heat from a hydrocarbon fire and maintain seal integrity in high temperature and material stress situations.

In a typical electrical penetrator or feedthrough arrangement, a one-piece conductor such as a conductive connector pin extends through a bore in an insulating sleeve or body, with appropriate seals brazed, bonded, or otherwise mechanically engaged between the outer body and pin at each end of the penetrator assembly. In the case of ceramic penetrators, unique challenges exist in manufacture and subsequent use of the penetrator, due to the different coefficients of expansion of the different materials used in the penetrator assembly. In one known arrangement, the seals comprise metal sealing sleeves which seal the insulating sleeve of ceramic or the like to the conductive connector pin body. When temperature varies from the temperature at which parts were assembled, the parts expand by different amounts due to differences in coefficient of thermal expansion. If not properly managed, the different rates of expansion for the different material parts may induce stress within the assembly, and may lead to failure of the penetration.

Existing systems, apparatuses, and methods for wet- and dry-mate connectors and for electrical penetrators and penetrator assemblies are known and are described in at least U.S. Pat. No. 7,959,454, entitled WET MATE CONNECTOR (Ramasubramanian et al.), U.S. Pat. No. 8,123,549, entitled MULTIPLE LAYER CONDUCTOR PIN FOR ELECTRICAL CONNECTOR AND METHOD OF MANUFACTURE (Jazowski et al.), U.S. Pat. No. 8,287,295, entitled ELECTRICAL PENETRATOR ASSEMBLY (Sivik et al.), and U.S. Pat. No. 8,968,018, entitled ELECTRICAL PENETRATOR ASSEMBLY (Sivik et al.), each of which are incorporated by reference herein in their entirety.

To operate safely, reliably, and efficiently, the penetrator system must feature some level of modularity. This modularity allows the system to be installed and tested in a controlled environment, and allows the system to be readily upgraded over the useful design life based on lessons learned in the field.

SUMMARY OF THE INVENTION

This invention provides a modular electrical feedthrough system for use in offshore and top-side electrical submersible pump ("ESP") installations. The modular design of the present invention allows the bulk of work to be performed onshore in a factory environment, with minimal work being performed offshore/onsite, which reduces operational cost.

Pressure integrity is provided by two bulkhead penetrator sealing elements. The first, a ceramic penetrator, is comprised of a ceramic insulator with metalized surfaces to provide electrical stress control, and a two-piece metallic conductor which is sealed to the ceramic insulator by a set of metallic end sleeves. These insulators are sealed into a flange (or other suitable end connector metallic housing) via metallic sealing elements (metal-to-metal seal, braze and/or weld). The temperature envelope of the materials of construction and sealing configuration allows for pressure containment, even when the assembly is wetted by a hydrocarbon fire. The second bulkhead penetrator sealing element is intended to operate sufficiently deep within the equipment to allow for temperatures to drop to manageable levels for traditional thermoplastic, polymeric, or elastomeric sealing elements.

Modularity is achieved, in part, through a set of stab-in connectors, which make an electrical connection during the installation of a tree cap, or other secondary pressure barrier. Additionally, a dry-mate connector on the outside of the secondary pressure barrier provides for quick connect capability to a junction box, or other power source. The use of a dry-mate connector on the outside of the second barrier provides for power to be physically disconnected without the need to remove the pressure containing penetrator. This system configuration only requires the final cable termination or splice be performed in the field or onsite, allowing for all pressure containing elements, and most high voltage terminations, to be factory installed and tested prior to deployment.

In a first embodiment the invention provides a modular electrical connection system for subsea applications comprising: a stab receptacle assembly, the stab receptacle assembly comprising: a stab receptacle base; a compliance mount disposed on the stab receptacle base; a set of stab receptacles, each stab receptacle in the set of stab receptacles being connected to a cable pigtail and being adapted to mate with a stab plug in a set of stab plugs; and a stab plug assembly disposed oppositely facing the set of stab receptacles, the stab plug assembly comprising the set of stab plugs and a set of guide funnels, the set of guide funnels adapted to guide the set of stab receptacles into a mating position with the set of stab plugs; wherein the set of stab receptacles are disposed on the compliance mount and facing the set of stab plugs for matingly connecting with the set of stab plugs, and wherein the compliance mount is adapted to compensate for a range of physical misalignment between the set of stab receptacles and set of stab plug to facilitate successful mating connection.

In this first embodiment the invention may further be characterized as follows: a tubing hanger assembly comprising: a tubing hanger disposed within a casing hanger and adapted to form a pressure barrier at a production bore, the tubing hanger having an upper portion disposed above the production bore and a lower portion disposed within the production bore, the stab plug assembly disposed on the upper portion of the tubing hanger; and a tubing hanger penetrator assembly comprising: an electrical penetrator; a tubing hanger penetrator sealing module within the tubing hanger, comprised of an electrical penetrator, penetrator shells, and penetrator sealing elements; or characterized a termination housing disposed in the production bore and at the bottom of the tubing hanger, the termination housing having a top and a bottom and comprising: a clamshell housing forming a termination volume about a sealing boot and a cable; and a termination housing end disposed at the bottom of the termination housing, the termination housing end comprising a set of seals, wherein the termination housing in combination with the set of seals isolates the electrical penetrator from the production bore; or characterized by wherein the set of seals comprises a gland seal and a boot seal; or characterized by a set of cable bands disposed around the clamshell housing to secure the clamshell housing to the termination housing end; or characterized by a bladder disposed within the clamshell housing and with the termination housing end forming a termination cavity for receiving oil; an oil fill port formed in the termination end housing in fluid communication with the bladder and through which oil is delivered to the termination cavity for promoting the integrity of the termination housing; or characterized by a boot seal disposed within the clamshell housing and adapted to receive portions of the cable and the electrical penetrator within a cavity formed by the boot seal; or characterized by a boot seal disposed intermediate the clamshell housing and the termination housing end to prevent fluid ingress from the termination housing into interstices formed in the cable.

In a second embodiment, the invention provides a modular electrical connection comprising: a tubing hanger assembly comprising: a tubing hanger disposed within a completion tubing hanger and adapted to form a pressure barrier at a production bore, the tubing hanger having an upper portion disposed above the production bore and a lower portion disposed within the production bore, the stab plug assembly disposed on the upper portion of the tubing hanger; a tubing hanger penetrator assembly comprising: an electrical penetrator; a tubing hanger penetrator sealing module disposed around the electrical penetrator and within the tubing hanger; a termination housing disposed in the production bore and at the bottom of the tubing hanger, the termination housing having a top and a bottom and comprising: a clamshell housing forming a termination volume about a sealing boot and a cable; and a termination housing end disposed at the bottom of the termination housing, the termination housing end comprising a set of seals; wherein the termination housing in combination with the set of seals isolates the electrical penetrator from the production bore.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 7A provides a partial cross-section view of an electrical plug and penetrator assembly in accordance with the first embodiment of the present invention.

FIG. 7B provides a partial cross-section view of the sealing mechanism and flange interface of the penetrator housing module in accordance with the first embodiment of the present invention.

FIG. 13 provides a perspective, cross-section view of a multi-layer boot seal in accordance with the first embodiment of the present invention.

DETAILED DESCRIPTION

Figure 1:
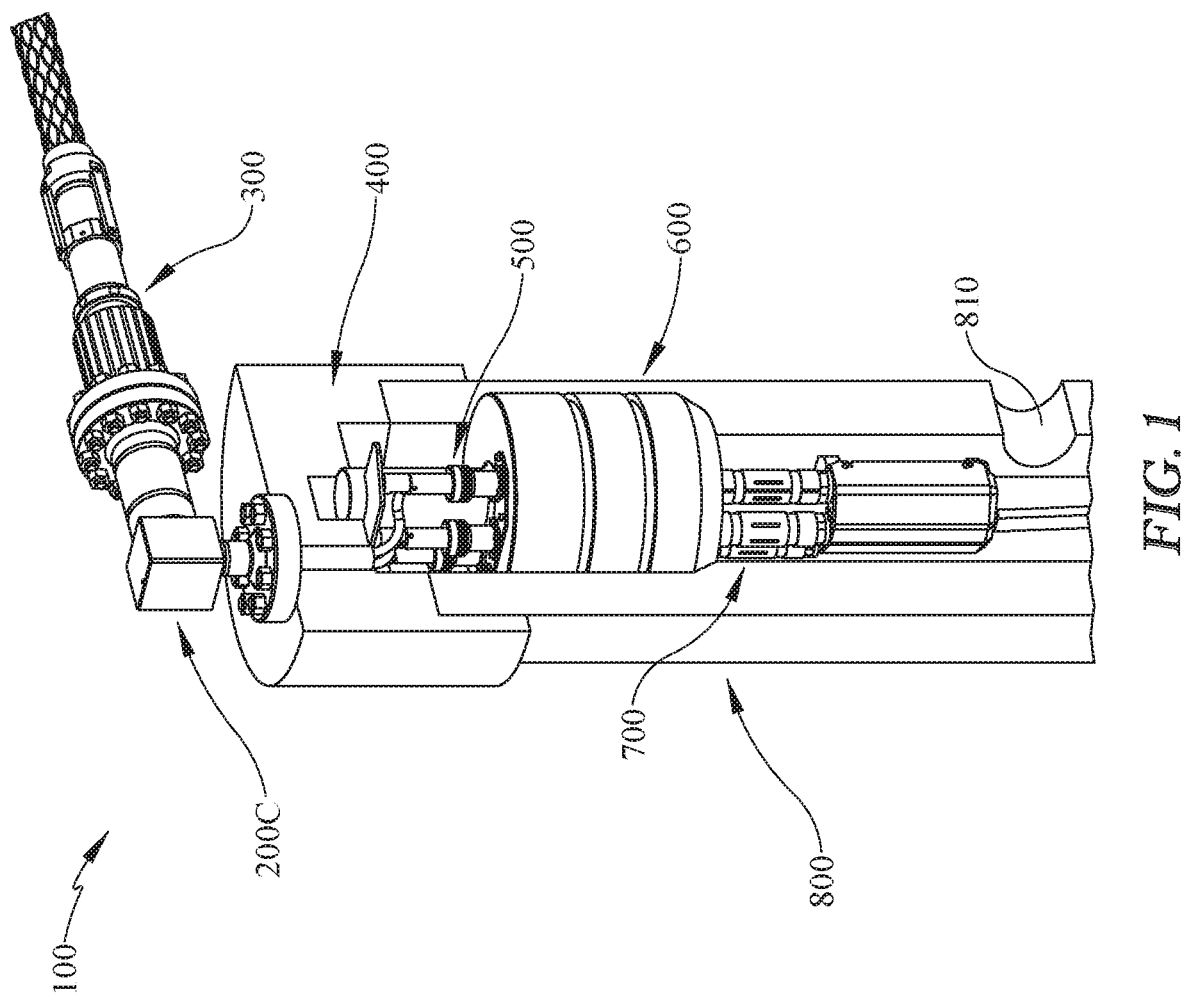
FIG. 1 provides a partial cross-section view of an interconnect system with a electrical feedthrough in accordance with a first embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one embodiment the present invention provides a modular feedthrough system. The modular feedthrough system provides an improved power feedthrough system through the introduction of modular elements. The modular system of the present invention can be readily reconfigured between applications without requiring qualification testing of existing components (e.g., electrical penetrator pins, sealing elements, or electrical insulators). Systems employing the modular system of the present invention may be upgraded through the life of the field, based on experience gained through use of the product, while maintaining a common interface to other equipment. The system can be refurbished, rather than outright replaced, during workover of the ESP. Additionally, system subassemblies can be installed at various locations (e.g., onshore factories) and then integrated at the worksite (e.g., offshore wellbay or other remote worksite). The modularity of the present invention reduces time required for integration, allows factory testing of more steps in the assembly process, and provides for factory testing of critical assemblies such as pressure barriers.

The modular feedthrough system of the present invention may comprise having two independent, fire resistant, pressure barriers. The barriers can withstand pressures of several thousand psi and are designed for operation when wetted with produced fluids. The system must provide electrical continuity of up to several thousand volts and several hundred or thousand amperes, as required by the application. In this embodiment, the modular system comprises a tubing hanger as the primary barrier and a tree cap as a secondary barrier, with a stabplate type connector between tree cap and tubing hanger, and may comprise the following components: electrical quick disconnect, electrical penetrator/connector—secondary barrier (tree cap); internal electrical connector—stab interface; electrical penetrator—primary barrier (tubing hanger), and cable breakout.

The electrical quick disconnect provides a connectorized end for the cable to the power source (junction box, transformer, or similar) and allows the electrical feedthrough to be physically disconnected from power source without removing a pressure barrier. The quick disconnect can be used, in conjunction with the secondary barrier penetrator, to add other capabilities, such as a flameproof or explosion-proof interfaces for compliance with industry specifications for electrical installations in flammable atmospheres. Additionally, termination shells can be reconfigured into various geometries (straight, angled or 90°) to meet application specific space envelopes, without changing the mating interface to the rest of the feedthrough system, nor the interface to the cable to the power source, and the system can be reconfigured with minimal requalification required. The system is fully shielded electrically to the wellhead, and features multi-layered electrical boot seals with semiconductive inner and outer layers (i.e., conductor shield and insulation shield), and an insulative inner layer.

The electrical penetrator in the secondary barrier provides protection against production fluid egress. The penetrator insulation materials may be ceramic, plastic, composite materials or other materials which provide suitable electrical insulation and structural integrity. In one embodiment the electrical penetrator comprises a ceramic penetrator with a metal ring brazed on the major OD of the pin. This ring may then be welded into a penetrator module housing. The penetrator module may then be welded into a flanged penetrator housing. An adapter spool provides a termination shell for the electrical termination, and also serves to provide an interface between the flanged penetrator housing and the tree cap. The geometry of this spool can be changed to accommodate different exit angles, as well as different sealing interfaces to the tree cap. Electrical termination comprises a crimp contact (which interfaces to geometry on the conductor in the pin), a boot seal having insulation and electrical stress control layers, and a cable management device adapted to align cables to the penetrator pins and which may be used to react axial loads or provide strain relief where the application warrants. The spool may be installed onto the tree cap with the female half of the internal electrical connector; this assembly may be shipped offshore and integrated as required and may have a single conductor or multiple conductors per penetration (e.g., split-phase or three-phase systems, or single or multi conductor penetrations for instrumentation).

The internal electrical connector in the stab interface may be a separable connector pair wherein one half is mounted to the secondary barrier (tree cap) and the other half is mounted to the primary barrier (tubing hanger). This configuration provides for integration of these subassemblies at any location, with final connections being made onsite. The electrical connection may be made as the tree cap is landed onto the casing. In one embodiment, a male connector may be mounted to the tubing hanger to provides an interface for electrical integrity checks (insulation resistance and continuity) during run-in of the complete assembly. A void below the male connector may be filled with a dielectric fluid that is denser than water to prevent accumulation of water/moisture at the electrical interface on top of the electrical penetrator. The female connector may be mounted to the tree cap via a spring-loaded compliance mount which takes up misalignment (axial, rotational, angular) due to manufacturing tolerances during mating. The compliance mount is necessary to prevent connectors from failing to mate or improperly mating, or otherwise being damaged during installation and assembly.

The electrical penetrator in the primary barrier (tubing hanger) is the primary sealing barrier against production fluid egress. Pressure containment and electrical continuity is provided by a bulkhead penetrator, comprising a conductive metal core insulated by an overmolded insulation, insulation sleeve (plastic or ceramic) or otherwise electrically isolated from the penetrator shells or primary barrier (tubing hanger) and may also comprise redundant seals. The penetrator insulation may be thermoplastic, thermoset, fiber-reinforced or similar plastic material. High temperature materials, such as ceramics or high temperature composites, may be used as warranted by the application (high temperature well fluid, high pressure reservoir, chemical resistance, etc.). The ESP cable is terminated to this bulkhead penetrator or spliced to a cable pigtail. The method of termination in the field (direct termination vs. pigtail splice) may be chosen based on the specific application, however direct termination reduces the number of connections made, increasing reliability of the system by reducing number of points of failure. The ESP cable may have a single conductor or multiple conductors per penetration (split-phase or three-phase systems, or single or multi conductor penetrations for instrumentation). The termination may be either pressure balanced oil-filled (PBOF) design or a 1 atmosphere (atm) canister. Due to the modularity of the present invention, these may be changed as needed for specific applications. The 1 atm design is typically potted with epoxy or a similar material. This constrains elastomer parts, helping to mitigate effects of RGD (rapid gas decompression). This potting also supports the broken out cable phase, preventing damage due to pressure end loads (buckling or extrusion of the cable into the 1 atm volume). The PBOF design requires that all elastomeric components be resistant to damage due to RGD, even in the unconstrained state as typically elastomers are only required to be RGD resistant when constrained in a rigid gland, by a housing or by potting. A flexible compensator allows the pressure in the termination housing to be equalized with the production annulus, preventing pressure loads on the cable along the longitudinal axis. Additionally, because there is no potting, it is not necessary to wait for the potting to cure prior to deployment. This reduces the time required for final integration in the field. The flexible compensator may be elastomeric, polymeric (PTFE or similar) or metallic. The PBOF design features a seal layout, where the cable sheath is terminated in a small, 1 atm void between seals. This prevents fluid ingress down the lead sheath of the cable. The 1 atm void between seals may be filled with epoxy or gel to provide support for the cable/sheath.

The cable breakout provides a mechanical protection to the ESP cable when broken out into single phases. The single phase breakout of the ESP cable provides protection against impact, fretting, and from production flow for exposed phases. The ESP cable is mechanically clamped into the tubing/tubing hanger. This provides a measurement datum for cutting/prepping cable for termination to the electrical penetrator on the primary barrier and gives a leverage point for forming cable into position for termination. Additionally, throughout the modular system of the present invention all connectors are keyed and all phases are labeled to allow for positive identification of phases or conductors through the system. This aids in installation and troubleshooting.

With respect to FIG. 1, a partial cross-section view of an interconnect system 100 with an electrical feedthrough is provided. The interconnect system 100 is a feedthrough system for delivering power to a downhole ESP. The modularity and features of the interconnect system 100 provides for the installation and operation of downhole ESPs in an offshore environment, while providing for pressure integrity and operation in an explosive atmosphere. The system 100 delivers 3-phase AC power to a downhole ESP, while providing two independent pressure barriers. The depicted system provides for pressure containment up to several thousand psi design pressure and operation in a Zone 1 classified hazardous area.

The system 100 comprises several components including the wellhead plug subassembly 200C, the dry-mate connector receptacle 300, the secondary pressure containing body (tree cap) 400, the wellhead stab assembly 500, the primary pressure containing body (tubing hanger) 600, the tubing hanger penetrator module with cable breakout 700, and casing 800 with production outlet 810. The individual components of the system 100 are described in greater detail in FIGS. 2-24.

Figure 2:
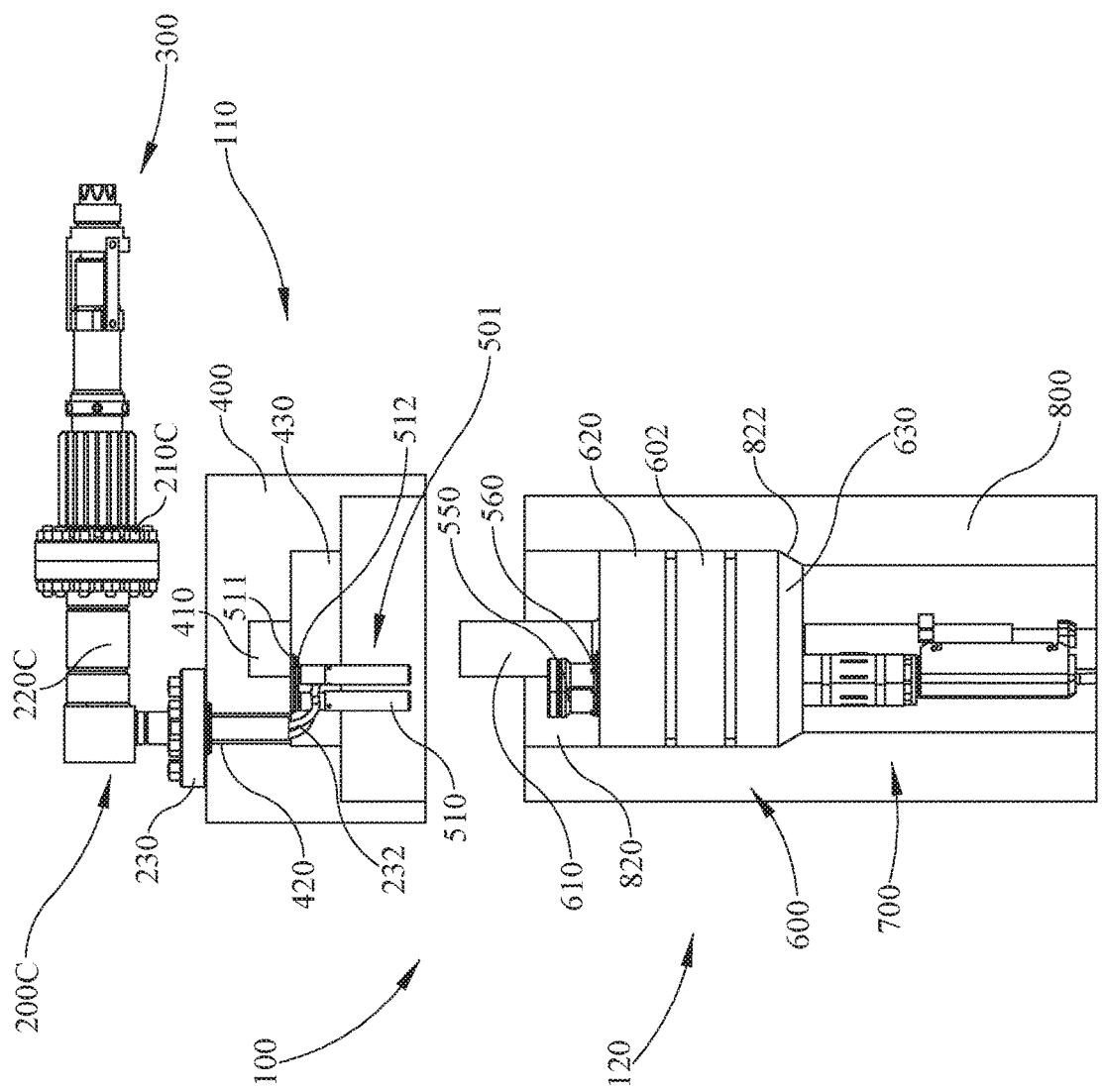
FIG. 2 provides a cross-section view of a secondary pressure containing body, tubing hanger, and casing in accordance with the first embodiment of the present invention.

With reference now to FIG. 2, a cross-section view of the system 100 comprising secondary pressure containing body 400, tubing hanger 600, and casing 800 is provided. Disposed on the outer surface of the secondary pressure containing body 400 is the wellhead plug subassembly 200C. The wellhead plug subassembly 200C provides similar functionality to the wellhead plug subassemblies 200A and 200B provided in FIG. 4, however, the geometry of the spool adapter 220C (depicted in FIGS. 5 and 6) may be preferred in some applications and may offer additional fire and pressure resistance over the spool adapters 220A and 220B. The spool adapters 220A and 220B provide similar if not identical overall function using different geometries determined by the overall envelope of the wellhead to those of spool adapter 200C.

The wellhead plug subassembly 200C comprises the electrical plug and penetrator assembly (penetrator housing module) 210C, the spool adapter 220C, secondary pressure containing body flange interface 230. The flange interface 230 is adapted to mount to a secondary pressure containing body 400, bulkhead, or other supporting surface. A channel 420 through the secondary pressure containing body 400 provides for the connection of the stab receptacle assembly 501 with the wellhead plug subassembly 200C. The stab receptacle assembly 501 comprising the stab receptacle 510 and compliance plate 512 is disposed within the interior 430 of the secondary pressure containing body 400. A space 410 at the center of the secondary pressure containing body 400 helps support and align the tubing hanger 600. A set of pigtails (cables) 232 provides for an operative electrical connection between a set of ceramic electrical penetrators 900 disposed in the interior 212C (shown in FIG. 5) of the penetrator housing module 210C and the stab receptacles 510. The stab receptacles 510 are adapted to mate with the stab plug 530 (shown in FIG. 18) disposed within the guide funnel 550. The guide funnel 550 is disposed on the upper surface of the plate 560 which is in turn disposed on the upper portion 620 of the tubing hanger 600. The body portion 602 of the tubing hanger 600 rests on the ledge 822 of the casing 800 and is disposed in the interior 820 of the casing 800. The body portion 602 may also have a set of grooves or indentations to aid in seal formation and fire-resistance. A set of electrical connections 570 (shown in FIG. 16) forms an electrical connection between the stab plug 530 and the tubing hanger penetrator module 700 through the upper portion 620, body 602, and lower portion 630 of the tubing hanger 600.

The design of the system 100 is modular. The components of the system 100 may be assembled onshore or at another location prior to complete assembly of the system 100 at an offshore or at a remote location. For example, the wellhead plug subassembly 200C and the stab receptacle assembly 501 may be assembled with the secondary pressure containing body 400 to form a secondary pressure containing body assembly 110 at an onshore location and tested for pressure integrity and electrical faults in a controlled factory setting. Similarly, the tubing hanger 600 with tubing hanger penetrator module 700 may be assembled to form a middle assembly 120 and be tested onshore in a manner similar to the secondary pressure containing body assembly 110. For final assembly, the middle assembly 120 may first be installed on the casing 800, and then the secondary pressure containing body assembly 110 may be landed on the middle assembly 120 and casing 800. The modular design provides for the independent testing of the constituent components of the system 100 prior to installation of the component assemblies at the work site. This provides for simpler, or better controlled, processes for assembly, problem identification, and repair.

Figure 3:
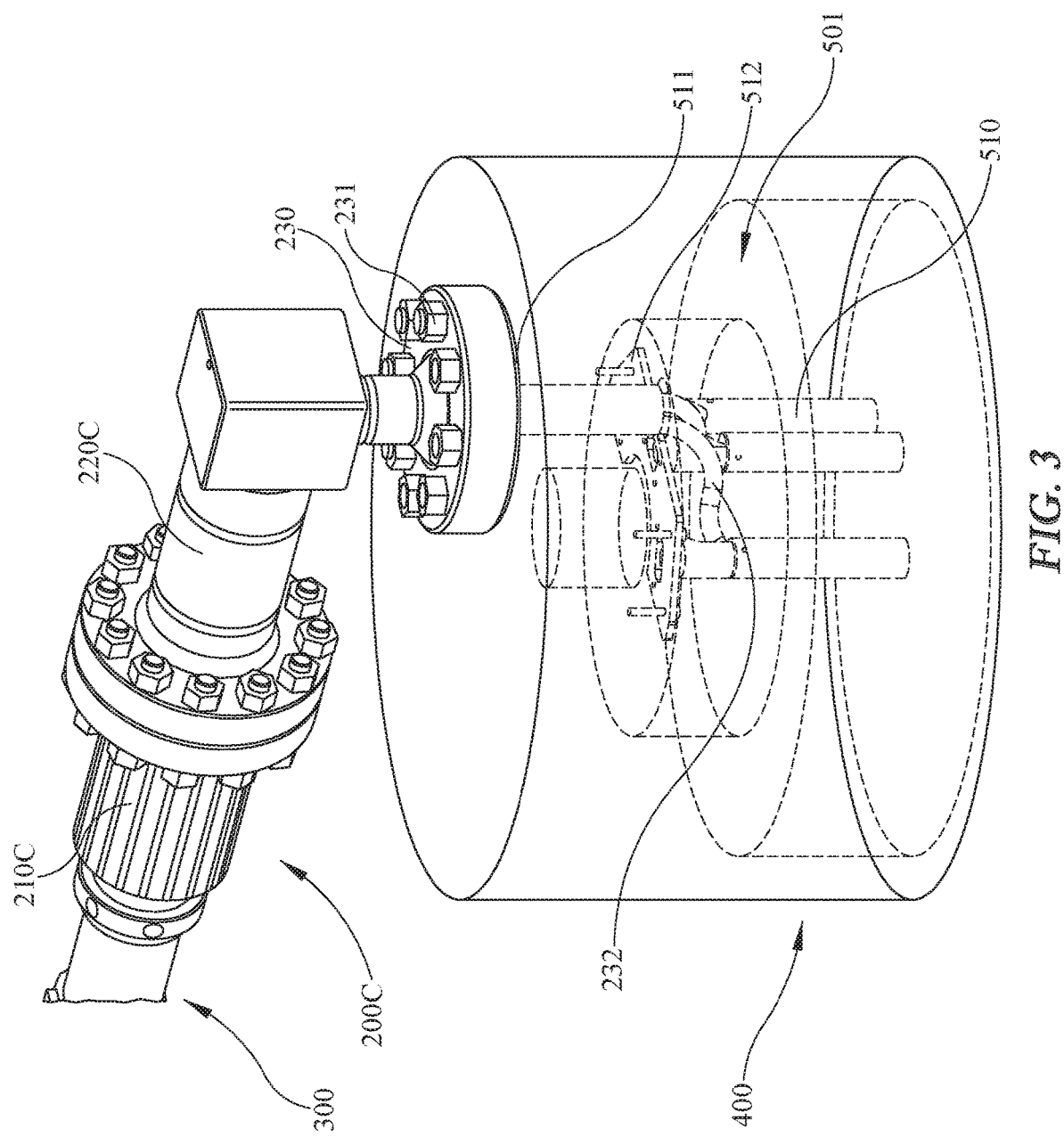
FIG. 3 provides a perspective view of an electrical plug and penetrator assembly, spool adapter, and stab receptacle connector with compliance mount in accordance with the first embodiment of the present invention.

With reference now to FIG. 3, a detailed view of the wellhead plug subassembly 200C and stab receptacle assembly 501 is provided. The wellhead plug subassembly 200C and stab receptacle assembly 501 together with the secondary pressure containing body 400 comprise the secondary pressure containing body assembly 110. The wellhead plug subassembly 200C comprises the penetrator housing module 210C and the spool adapter 220C with flange interface 230. The wellhead plug subassembly 200C includes pigtails 232 that are routed through the secondary pressure containing body to the stab receptacle assembly 501. The secondary pressure containing body assembly 110 may be assembled and functionally tested at an onshore facility prior to final installation or deployment.

In one embodiment, assembly of the secondary pressure containing body assembly 110 is conducted in the following sequence: mount the stab receptacle base 511, route the wellhead penetrator pigtails 232 through the secondary pressure containing body 400, install the wellhead penetrator assembly 501, terminate the pigtails 232 into the stab receptacle 510, and conduct insulation resistance (IR) testing and continuity testing. The secondary pressure containing body assembly 110 assembly continues by installing the stab receptacle assembly 501 onto the secondary pressure containing body 400 as shown in FIG. 2. The first half of the compliance mount plate 512 is first attached to the secondary pressure containing body 400 followed by the stab receptacle base 511.

Figure 4:
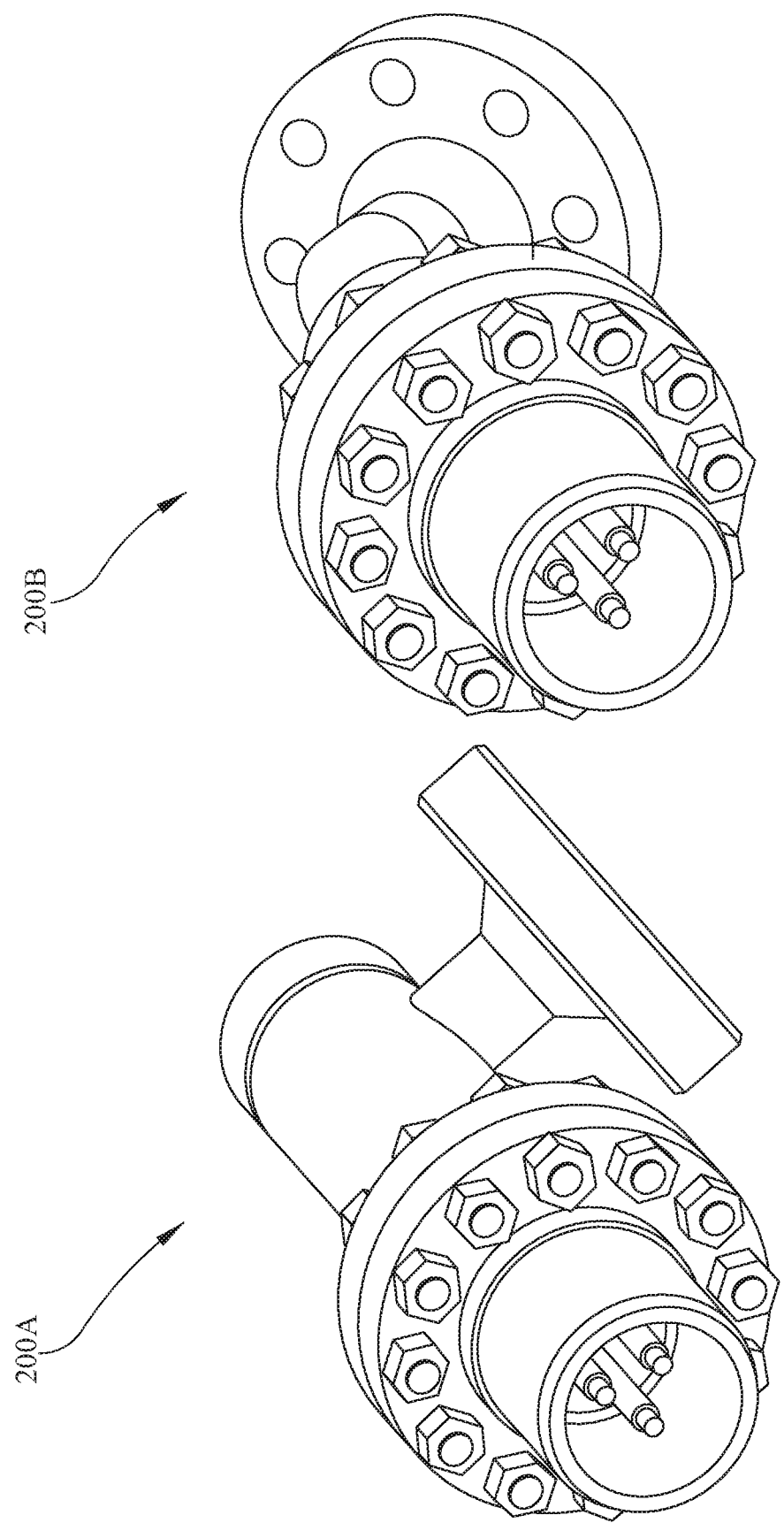
FIG. 4 provides a front perspective view of two embodiments of a penetrator housing module and wellhead spool adapter in accordance with the first embodiment of the present invention.
Figure 5B:
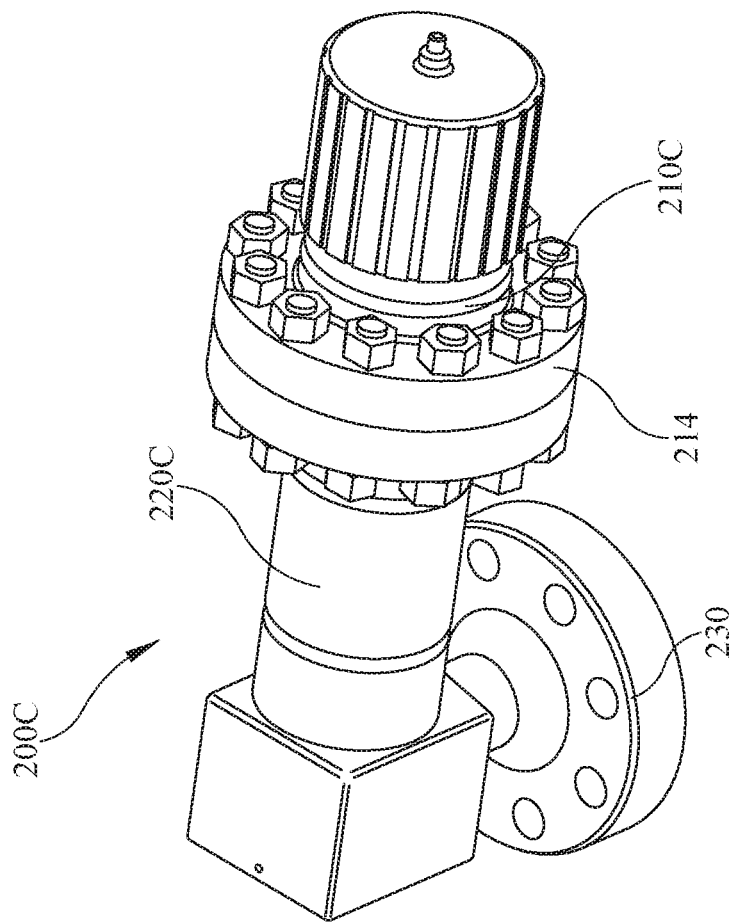
FIGS. 5A and B provide front perspective views of a penetrator housing module and spool adapter in accordance with the first embodiment of the present invention.
Figure 5A:
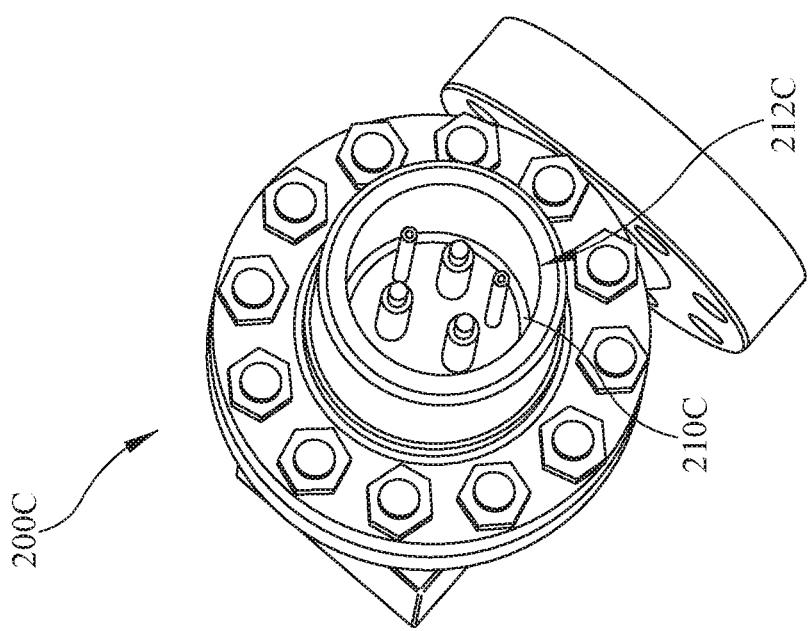
Figure 6A:
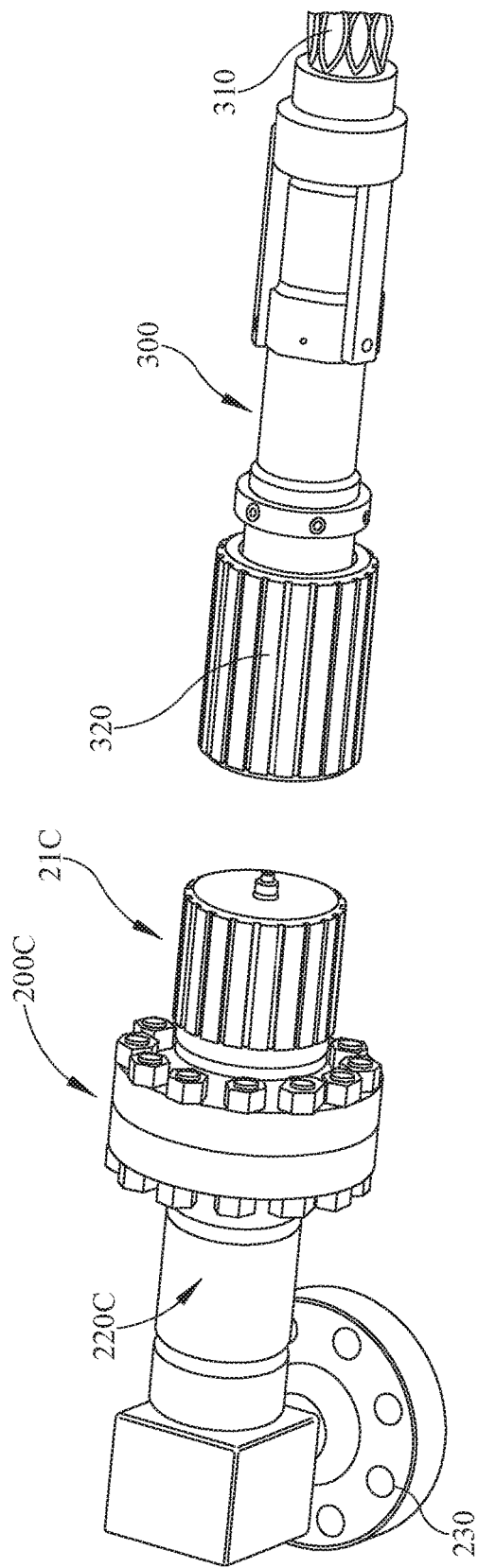
FIGS. 6A and B provide perspective views of an electrical plug and penetrator assembly, spool adapter, and dry-mate connector receptacle in accordance with the first embodiment of the present invention.
Figure 6B:
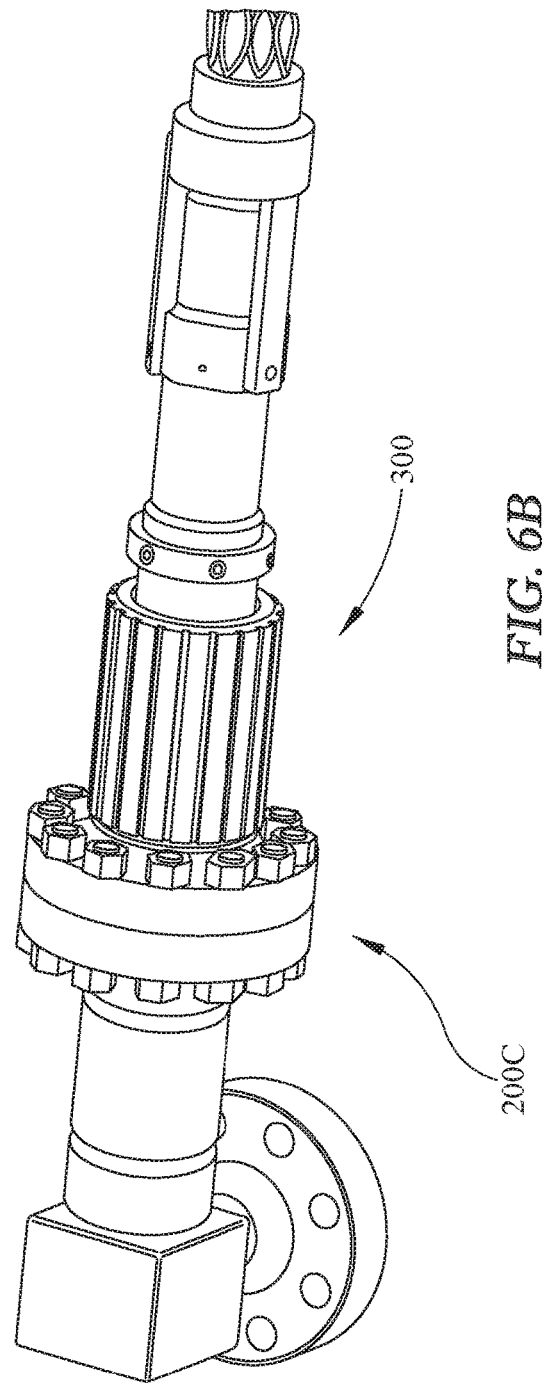

With reference now to FIG. 4, front perspective views of wellhead plug subassembly 200A and wellhead plug subassembly 200B are provided. The wellhead plug subassemblies 200A and 200B provide for alternative exit angles from the wellhead or secondary pressure containing body 400.

With reference now also to FIGS. 5A and 5B and 6A and 6B, the wellhead plug subassembly 200C with dry-mate connector receptacle 300 may be externally mounted to the secondary pressure containing body 400. The wellhead plug subassembly 200C functions as a pressure barrier while providing electrical continuity to the downhole ESP. Additionally, the mating connector pair of the wellhead plug subassembly 200C and dry-mate connector receptacle 300 provides compliance with applicable standards for electrical installations in hazardous locations. The wellhead plug subassembly 200C with dry-mate connector receptacle 300 consists of two primary sub-assemblies, the wellhead plug subassembly 200C and dry-mate connector receptacle 300, shown in FIGS. 6A and 6B.

The wellhead plug subassembly 200C provides pressure integrity and fire resistance, and serves as the electrical plug half of the mating connector. The subassembly, shown in FIGS. 5A and 5B, consists of three primary components: the penetrator module 212C, penetrator housing module 210C and spool adapter 220C. The mating interface between the penetrator housing module 210C and the spool adapter 220C is a flange interface 70, shown in FIG. 7B. The non-standard flange interface 70 incorporates a ring gasket seal 72, and is adapted to a typical Type 6B flange interface.

With reference back to FIGS. 6A and 6B, the dry-mate connector receptacle 300 is secured to the penetrator housing module 210C by the locking sleeve 320. The receptacle pigtail 310 provides an electrical connection from an external power source to the downhole ESP.

With reference now to FIG. 7A, a partial cross-section view of the wellhead plug subassembly 200C is provided. The penetrator module 213C contains the ceramic electrical penetrators 900, and comprises two metallic shells 216C and 217C (shown in FIGS. 10 and 11), which interface to three ceramic electrical penetrators 900, shown in FIG. 8. The ceramic electrical penetrators 900 are joined to the front shell 216C of the penetrator module 213C, by, for example, a combination of brazing and welding processes. The front 216C and rear shell 217C of the penetrator module 213C are subsequently welded together, and welded into the penetrator housing module 210C. The locations of these welds are shown at weld points 1701. The welding, assembly, and configuration of the penetrator module 213C comprising the ceramic electrical penetrators 900, front shell 216C and rear shell 217C provides a single, integral body comprising the penetrator module 213C, ceramic electrical penetrators 900, and penetrator housing module 210A for pressure integrity at the end connection.

With reference now to FIG. 7B, a partial cross-section view of the sealing mechanism 70 and flange interface 214C of the penetrator housing module 210C is provided. The single body formed in the process described above and comprising the penetrator module 213C, ceramic electrical penetrators 900, and penetrator housing module 210C is sealed to the spool adapter 220C by independent metal-to-metal seals, formed by face-to-face metal contact between two flange interfaces 215C and 214C (shown in FIG. 10) and a reusable metal gasket 72. The collar 211C of the penetrator housing module 210C is welded by weld 74 to the flange interface 214C. The inner seal 74 and gasket seal channel 240 with gasket 74 comprise the face-to-face metal contact seal between the flange interface 214C and 215C.

Figure 8:
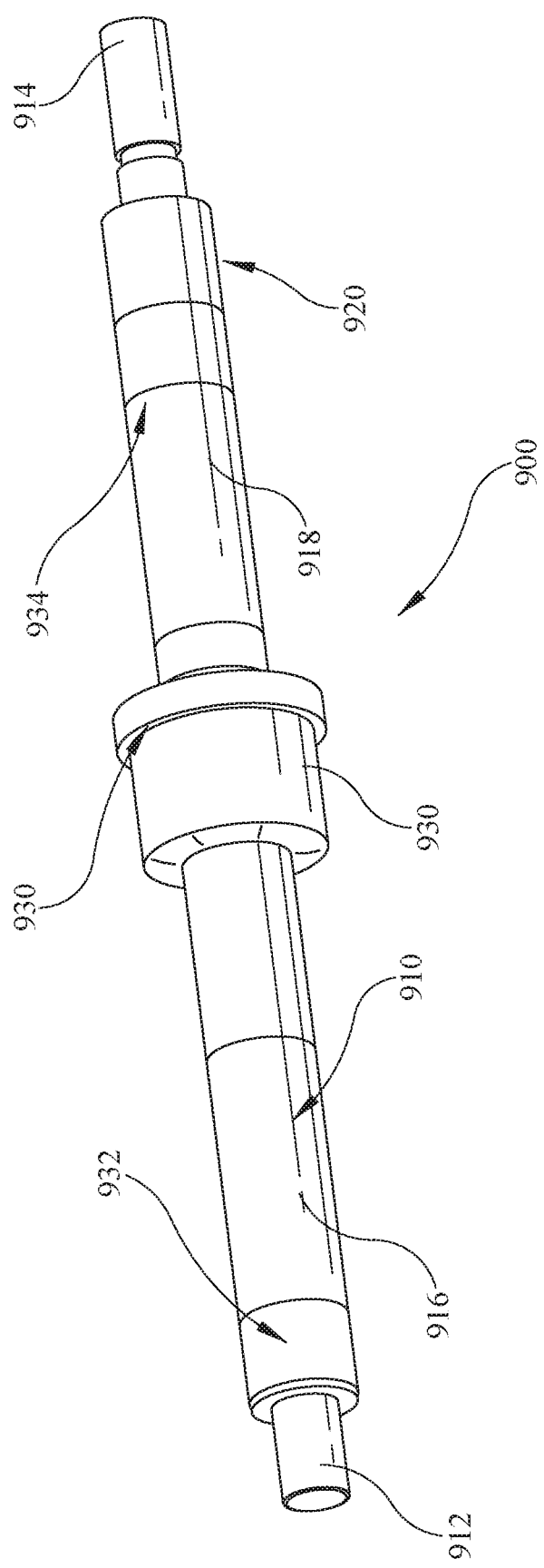
FIG. 8 provides a perspective view of a ceramic electrical penetrator in accordance with the first embodiment of the present invention.
Figure 9:
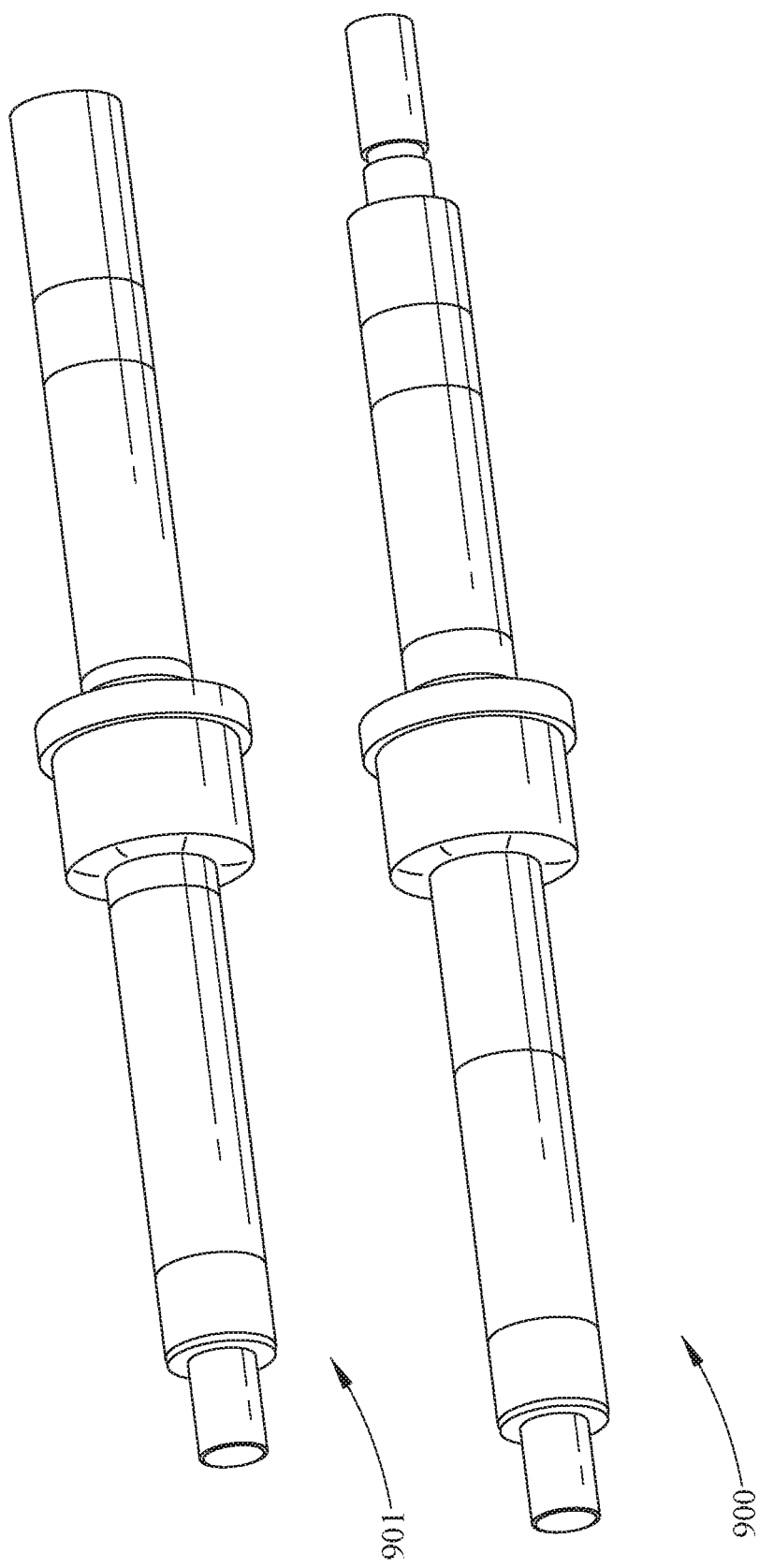
FIG. 9 provides perspective and cross-section views of alternate embodiments of ceramic electrical penetrators according to prior art and the present invention.

With reference now to FIGS. 8 and 9, perspective views of fire-resistant ceramic electrical penetrator 900 and an alternate embodiment penetrator 901 are provided. Each ceramic electrical penetrator 900 comprises a gold-plated, two-piece copper conductor 920, having a first end 912 and a second end 914, that is hermetically sealed into a ceramic insulator 910 via brazing and welding processes. The ceramic insulator 910 may comprise a first body portion 916 and a second body portion 918, or may comprise a single body portion. The ceramic insulator 910 may be substantially cylindrical and may be sealed over and joined to the conductor 920 by a sealing sleeve 930, a first metallic end sleeve 932, and second metallic end sleeve 934 by the brazing and welding processes. Ceramic insulators provide several advantages over polymeric injection molded insulated electrical pins, especially when the pin is acting as a penetrator, where large pressure differentials can exist.

The first advantage of ceramic insulators over polymeric insulation is resistance to failure due to temperature. Typical polymeric insulations are susceptible to significant reduction in mechanical and physical properties at their glass transition temperature, and may have issues with creep over the service life of the penetrator. In contrast, the limiting temperature for the mechanical integrity of ceramic penetrator assemblies, such as for ceramic electrical penetrator 900, is typically dictated by the braze filler and metallic components including the first 932 and second 934 end sleeves, the sealing sleeve 930, and the conductor 920. This allows the ceramic electrical penetrator 900 to withstand temperatures several hundred degrees higher than can be achieved using polymeric insulations, though electrical integrity may be compromised due to other polymeric components in the system, such as cable insulation and boot seals. Additionally, long-term creep effects are eliminated when using ceramic insulators such as insulator 910 and ceramic materials traditionally exhibit better chemical resistance versus traditional polymeric pin insulation materials.

The ceramic electrical penetrator 900 comprises several differences compared to penetrator 901, including different electrical stress control geometry, sealing sleeve geometry and updated electrical contact geometry. The differences between the geometry of the sealing sleeve 930 of ceramic electrical penetrator 900 and geometry of the sealing sleeve 931 of penetrator 901 are shown.

Figure 10:
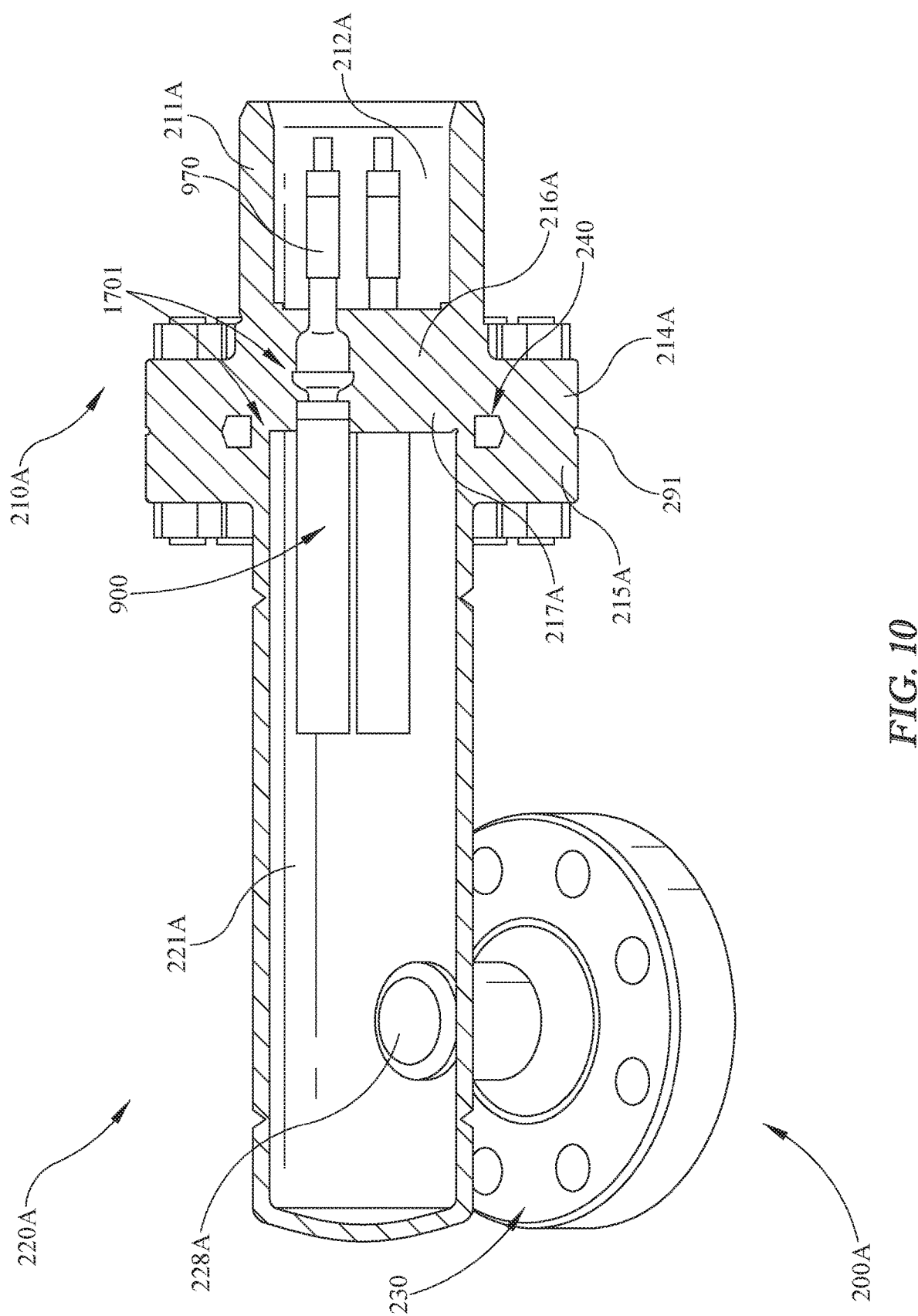
FIG. 10 provides a cross-section view of a wellhead plug and termination shell/spool adapter assembly comprising the penetrator housing module, a set of ceramic penetrators, and wellhead spool adapter in accordance with the first embodiment of the present invention.
Figure 11:
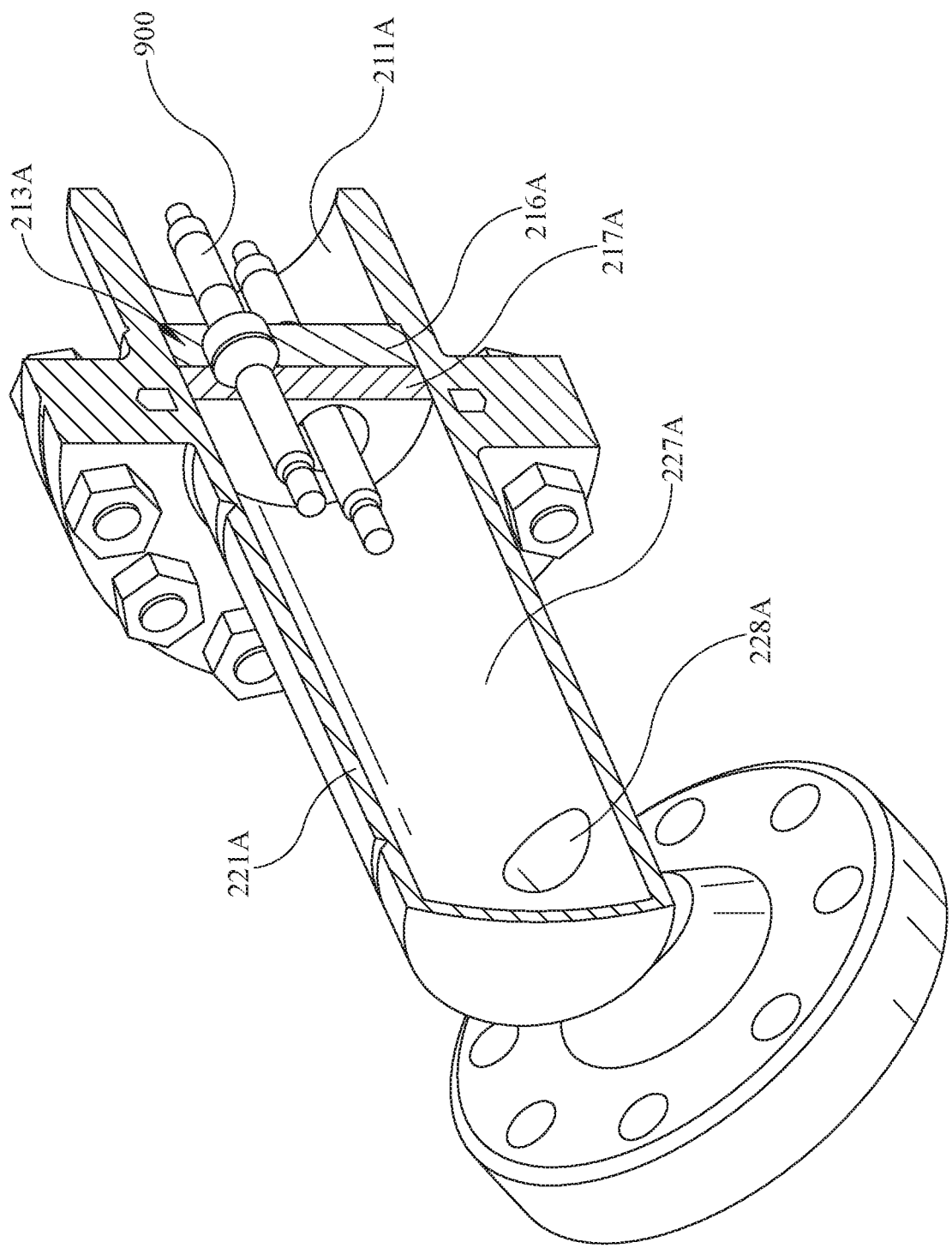
FIG. 11 provides a rear perspective, cross-section view of a wellhead plug subassembly comprising a penetrator housing module, a set of ceramic penetrators, and wellhead spool adapter in accordance with the first embodiment of the present invention.

With reference now to FIGS. 10 and 11, cross-section views of the wellhead plug subassembly 200A comprising a penetrator housing module 210A, a set of ceramic electrical penetrators 900, and a wellhead spool adapter 220A are provided. The front, interfacing portion 970 of the ceramic electrical penetrators 900 in the opening 212A of the penetrator housing module 210A operatively interface with the boot seal 1400 of the dry-mate connector receptacle 300, shown in FIGS. 11 and 13. The spool adapter 220A provides a 90° exit connection from a Type 6B flange interface 230 to a compact flange interface 215A, and is a weldment of simple components comprising pipe 221A, neck 228A, flange interface 230, and flange interface 215A.

In addition to providing pressure integrity under normal conditions, the wellhead plug subassembly 200A must maintain pressure integrity in the event of a fire; this functionality is in compliance with API 6FB, Part II. API 6FB, Part II governs fire testing of end connection for offshore well bay conditions, and requires that the end connection, such as wellhead plug subassembly 200A, under 75% working pressure, be subjected to a 30 minute fire from a single burner at fire point 291 of the penetrator housing module 210A at a measured temperature of 1800° F. Tensile and bending loads may be applied, as applicable. In an alternative embodiment passive fire protection techniques, including but not limited to thermal insulation jackets installed over the wellhead plug subassembly 200A during makeup, may be employed.

The penetrator module 213A, penetrator housing module 210A and spool adapter 220A provide the secondary pressure containing body pressure barrier for the power interconnect system 100; the boundaries of this pressure containment function within the interior area 227A behind the penetrator module 213A and within the spool adapter 221A.

Figure 12A:
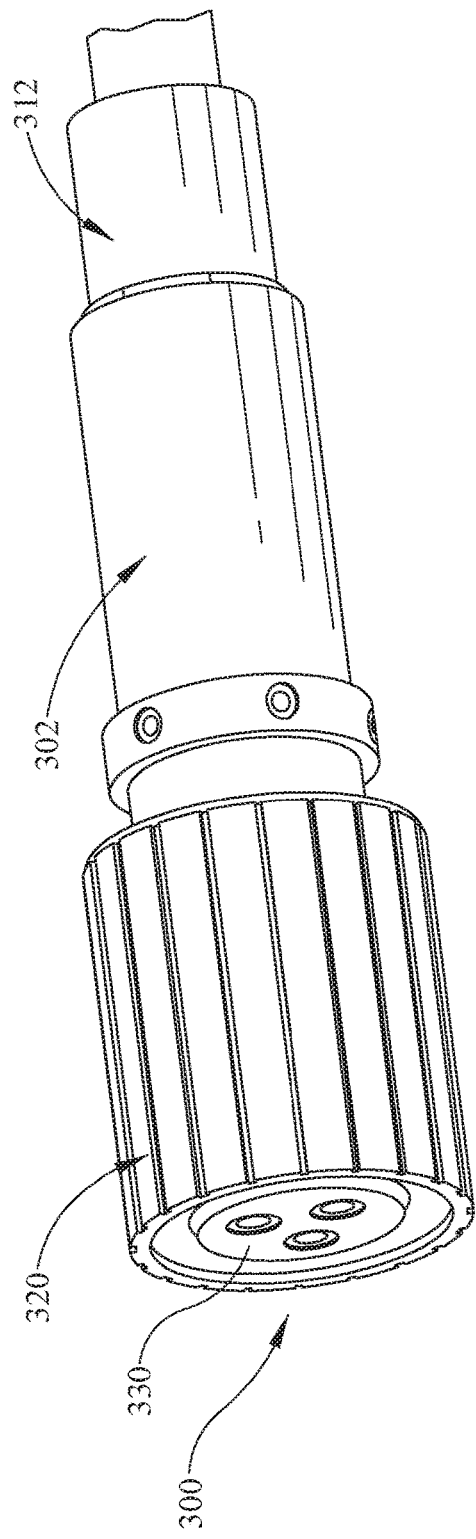
FIGS. 12A and 12B provide perspective (12A) and cross-section views (12B) of a dry-mate connector receptacle in accordance with the first embodiment of the present invention.
Figure 12B:
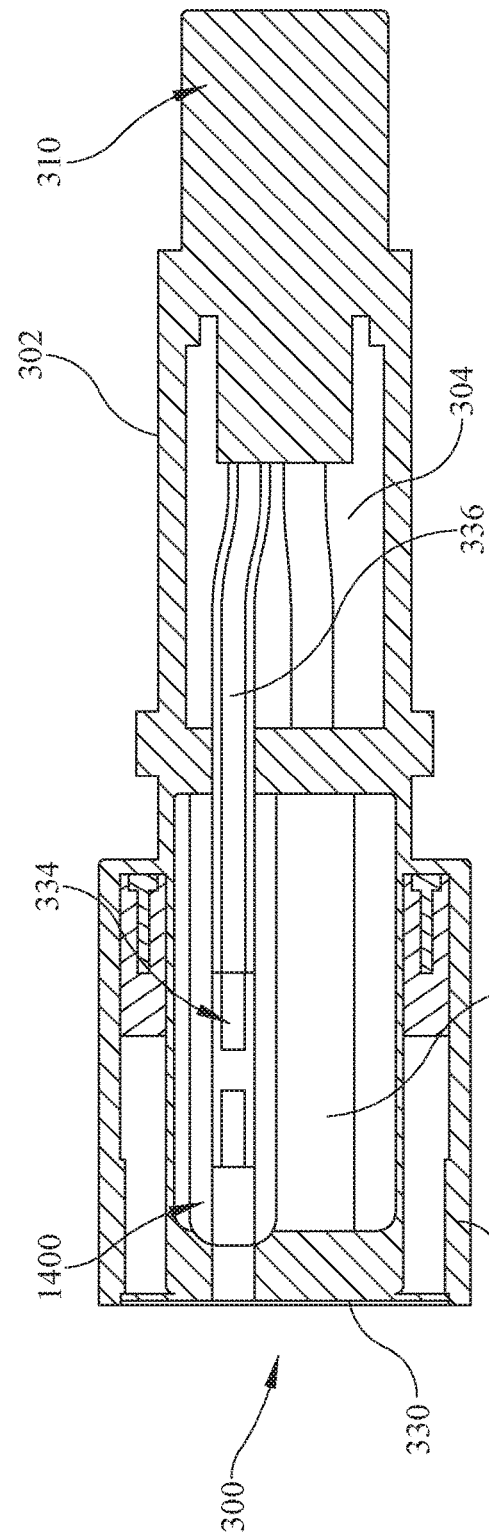

With reference now to FIGS. 12A and 12B, perspective and cross-section views of a dry-mate connector receptacle 300 are provided. The dry-mate connector receptacle 300 provides the quick disconnect functionality of the wellhead plug subassembly 200A and dry-mate connector receptacle 300, as well as compliance with the ATEX directive. Due to the current and voltage applied to the system, a flameproof (Ex d) protection method provided by the Ex d cable gland 312 is implemented in the design for simplicity, since other protection methods, such as intrinsic safety, are not practical for the given energy levels or assembly constraints.

The dry-mate connector receptacle 300 comprises the following primary components: the locking sleeve 320, termination shell 302, Ex d cable gland 312, power cable pigtail 310, socket contact subassembly 330 and boot seal 1400. The individual cables 336 of the cable pigtail 310 separate from the main pigtail 310 in the interior area 304 and are crimped on to socket contact 334 which is adapted to mate with the electrical contact 920 of the interfacing portion 970 of the ceramic electrical penetrator 900.

With reference now to FIG. 13, a perspective, cross-section view of the multi-layer boot seal 1400 is provided. Electrical continuity between an external power source and the system 100 is provided by the socket contact 334 of the socket assembly 330 shown in FIG. 12B. The boot seal 1400 comprises an insulating middle layer 1420 and semi-conductive inner layer 1430 and outer layer 1410. The socket assembly 330 crimps directly onto the individual cables 336 of the cable pigtail 310, and interfaces via the socket contact or contact band 334 to the ceramic electrical penetrators 900 in the penetrator housing module 210A. Electrical insulation and stress control are provided by the elastomeric boot seal 1400.

Figure 14:
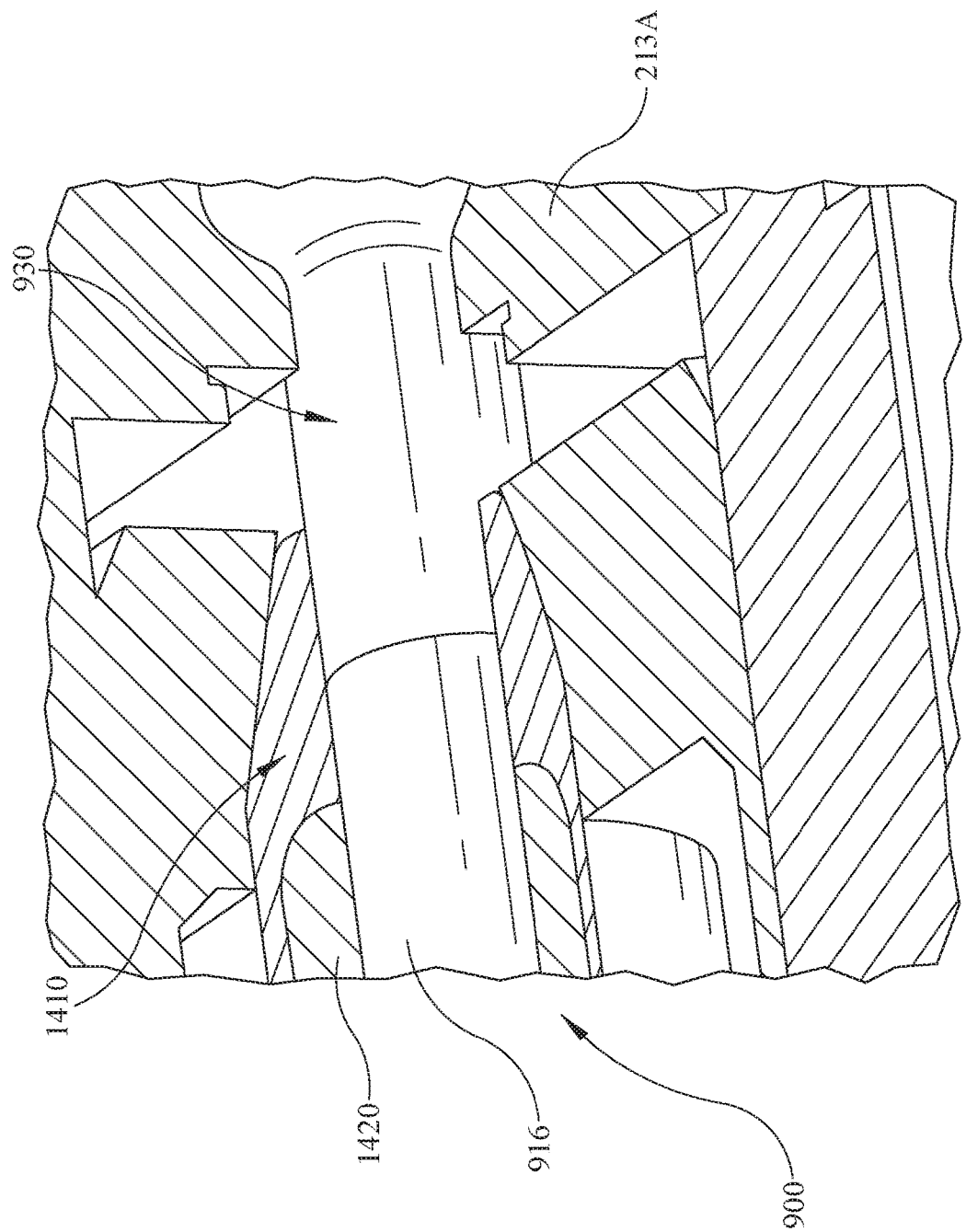
FIG. 14 provides a detailed view of a boot seal interface at the ceramic electrical penetrator in accordance with the first embodiment of the present invention.

With reference now to FIG. 14, a detailed view of the interface between the boot seal 1400 and the ceramic electrical penetrator 900 is provided. The inner semi-conductive layer 1430 of the boot seal 1400 acts as a conductor shield and is intimately bonded to the insulation layer 1420 to prevent partial discharge (PD). The outer semi-conductive layer 1410 acts an insulation shield, maintaining ground plane continuity from the cable insulation screen of the cable 336 to the penetrator housing module 210B. The outer semi-conductive layer 1410 intimately contacts a layer of metallization of the sealing sleeve 932 on the outside of the ceramic insulator 910 of the ceramic electrical penetrator 900. The metallization 930 on the outside of the first body portion 916 of the ceramic insulator 910 of the ceramic electrical penetrator 900 is in direct contact with the penetrator module 213A, which is also grounded through contact with the receptacle locking sleeve 320. Individual phase shielding is not maintained beyond the wellhead plug subassembly 200A.

The flameproof protection of the present invention relies on control of the width and length of all flame paths. In the event of an arc inside the connector, the tight clearances within the dry-mate connector receptacle 300 and penetrator housing module 210A remove energy from the flame front, such that combustion is unsustainable, thus preventing the internal explosion from propagating to the surrounding environment. The flame path control is shown in more detail in FIG. 15.

Figure 15:
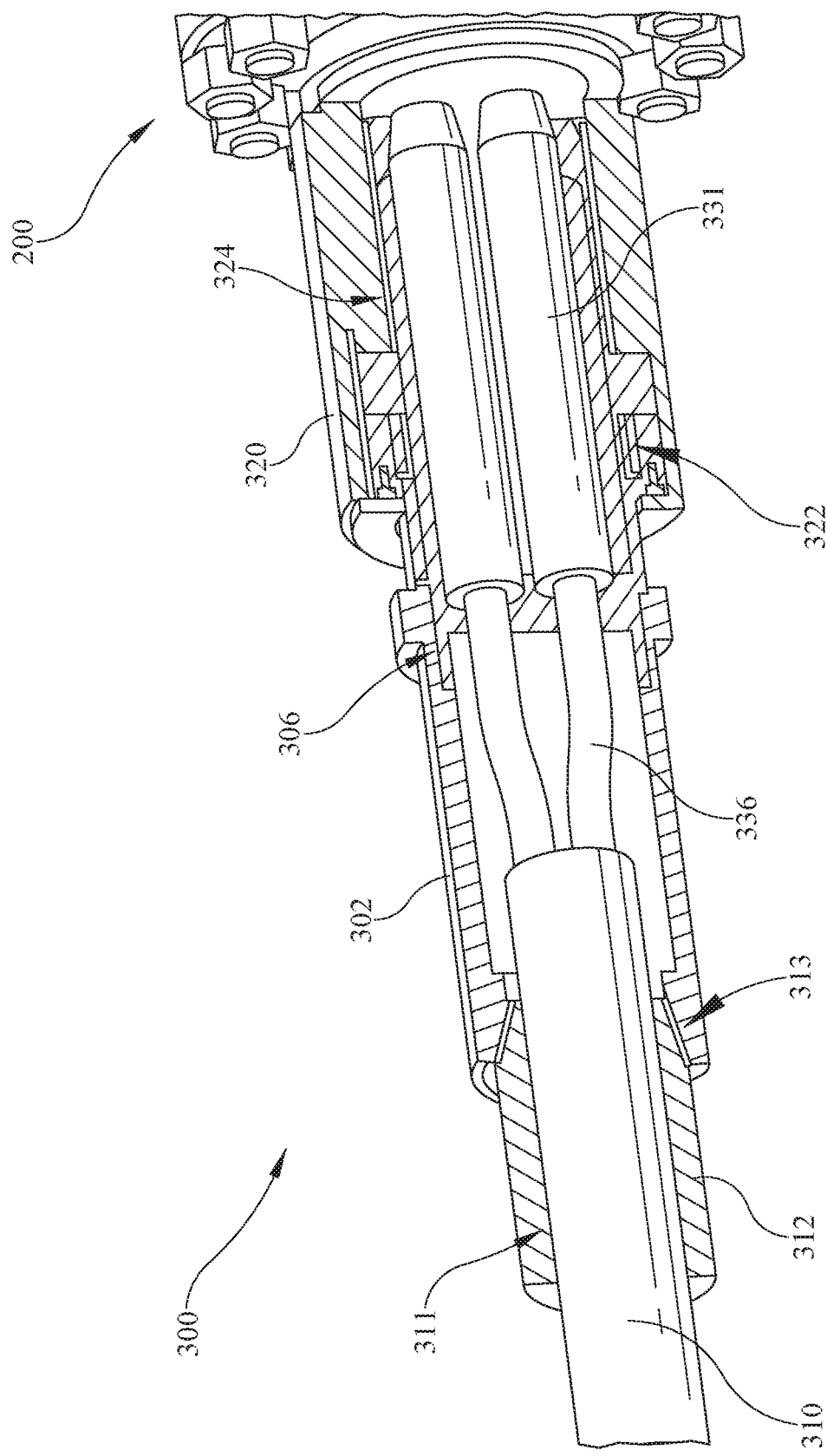
FIG. 15 provides a detailed, cross-section view of a dry-mate connector receptacle operatively engaged with a penetrator housing module in accordance with the first embodiment of the present invention.

With reference now to FIG. 15, a detailed, cross-section view of the dry-mate connector receptacle 300 operatively engaged with the penetrator housing module 210A is provided. Flame path control is maintained at the mating interface between the receptacle and plug 324, between the receptacle shells at 322 and 306 and at the cable entry 313 and 311. The mating interface 324 and the gaps between receptacle shells 322 and 306 are simple lap joints, sized in accordance with EN 60079-1; the cable gland 312 may be a commercially available cable gland for use in hazardous locations. The controlled flame paths, 324, 322, 306, 313, and 311, are at the interfaces between each component in the dry-mate connector receptacle 300 and between the mating interface of the dry-mate connector receptacle 300 and wellhead plug subassembly 200A. The cable gland 312 interfaces to the termination shell 302 at point 313 of the dry-mate connector receptacle 300 via a simple NPT or metric thread interface.

Figure 16:
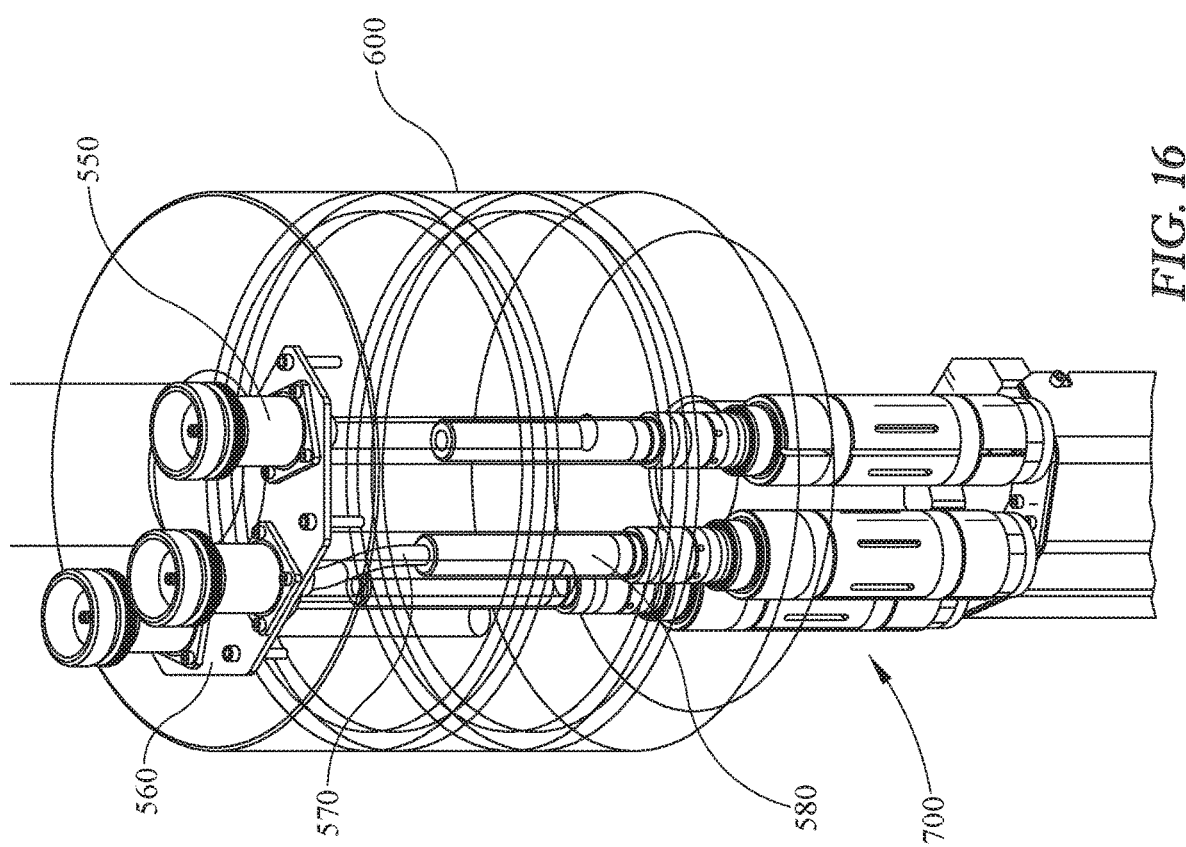
FIG. 16 provides a perspective, cross-section view of a tubing hanger with tubing hanger penetrator module assembly and stab plug in accordance with the first embodiment of the present invention.

With reference now to FIG. 16, a perspective, cross-section view of a tubing hanger 600 with tubing hanger penetrator module 700 and stab plug 530 is provided. The tubing hanger penetrator module 700 is disposed on the bottom of the tubing hanger 600 and terminated to the stab plug 530 (shown in FIG. 18) in the guide funnel 550 which is mounted on the plate 560. The tubing hanger penetrator 700 is terminated to the stab plug 530 and is integrated into the tubing hanger 600 at an onshore facility. The cable pigtail 570 and upper portion 580 of the tubing hanger penetrator 700 join the tubing hanger penetrator module 700 to the stab plug 530.

Figure 17:
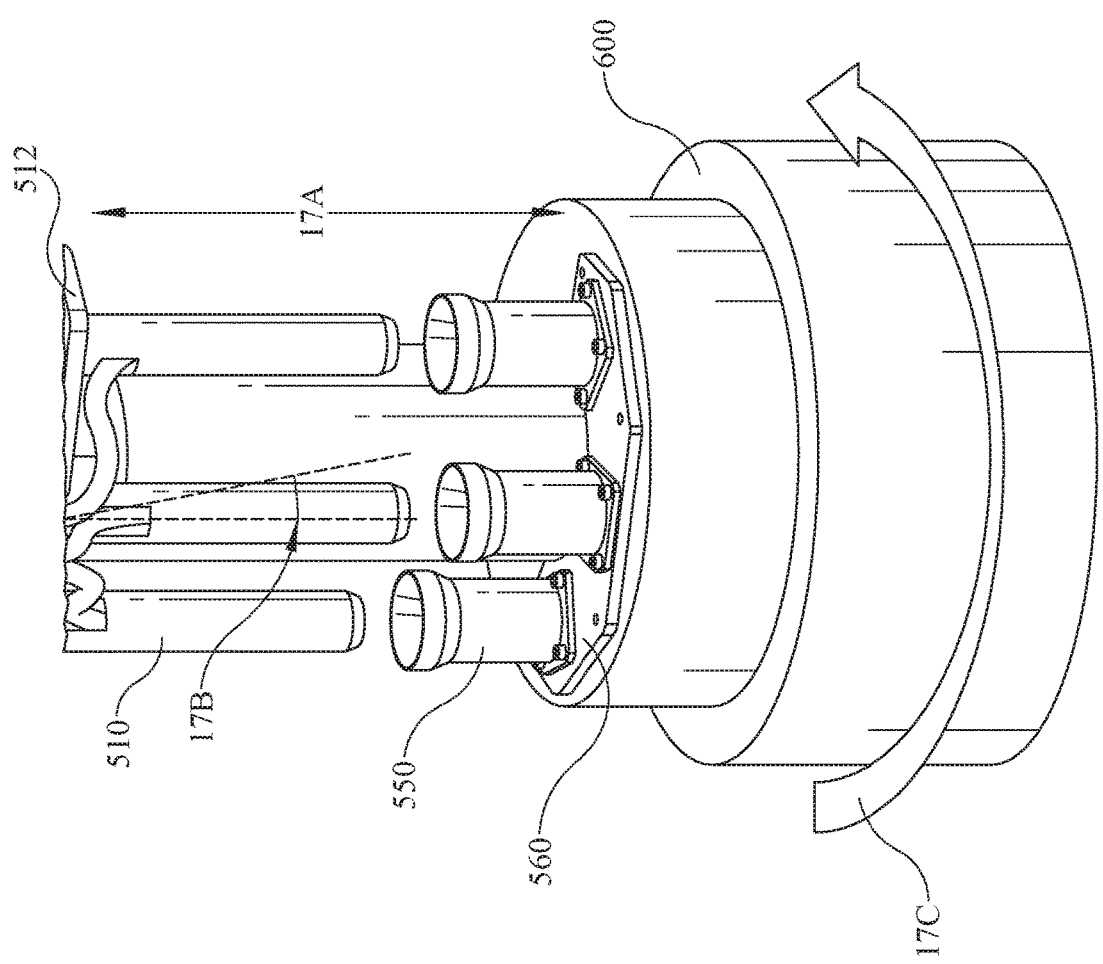
FIG. 17 provides a detailed view of the interface between a set of stab receptacles and a set of stab plugs, illustrating the misalignment tolerance properties of the compliance mount in accordance with the first embodiment of the present invention.

With reference now to FIG. 17, a detailed view of the interface between the set of stab receptacles 510 and set of guide funnels 550, illustrating the misalignment tolerance properties of the compliance mount 512 is provided. The stab receptacle 510 interface to the secondary pressure containing body 400 is a spring-loaded compliance mount 512. The compliance mount 512 provides misalignment tolerances for mating between the stab receptacle 510 and the guide funnel 550 and stab plug 530. Misalignment may be due to manufacturing and installation tolerances, temporary misalignment during secondary pressure containing body 400 landing or due to movement of wellhead components under operational conditions. The expected misalignment tolerance categories for the assembly are listed in Table 1 and the orientation is shown in FIG. 17. The axial tolerance 17A is compensated for by the spring loaded mounting plate 512. The rotational tolerance 17C is compensated for by the guide funnel 550 and slotted mounting plate 511. The angular tolerance 17B is compensated for by the guide funnel 550, slotted mounting plate 511, and spring loaded mounting plate 512.

TABLE 1

| Orientation | Mechanism |
|---|---|
| Axial | Spring loaded mounting plate |
| Rotational | Guide funnel |
| | Slotted mounting plate |
| Angular | Guide funnel |
| | Slotted and spring loaded mounting plate |

Figure 18:
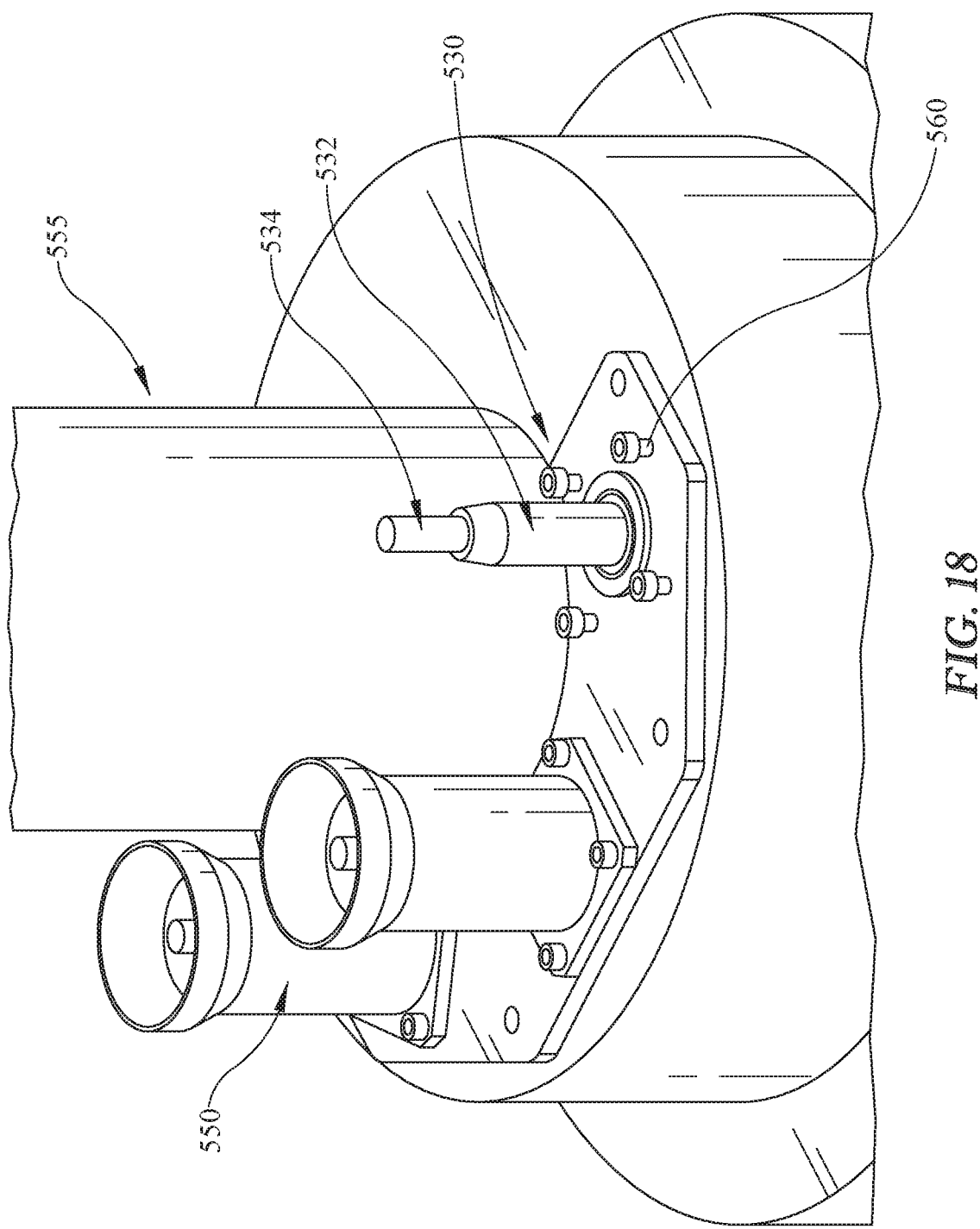
FIG. 18 provides a detailed view of the stab plug subassembly in accordance with the first embodiment of the present invention.

With reference now to FIG. 18, a detailed view of the stab plug subassembly 555 is provided. The stab plug 530 mounts to the top of the tubing hanger 600, and comprises alignment funnels 550 which provide fine alignment during mating. A simple male electrical contact 534 is crimped onto the end of the pigtail 570 from the tubing hanger penetrator module 700. Electrical insulation and stress control is provided by a boot seal 532 that is installed after crimping.

Figure 19:
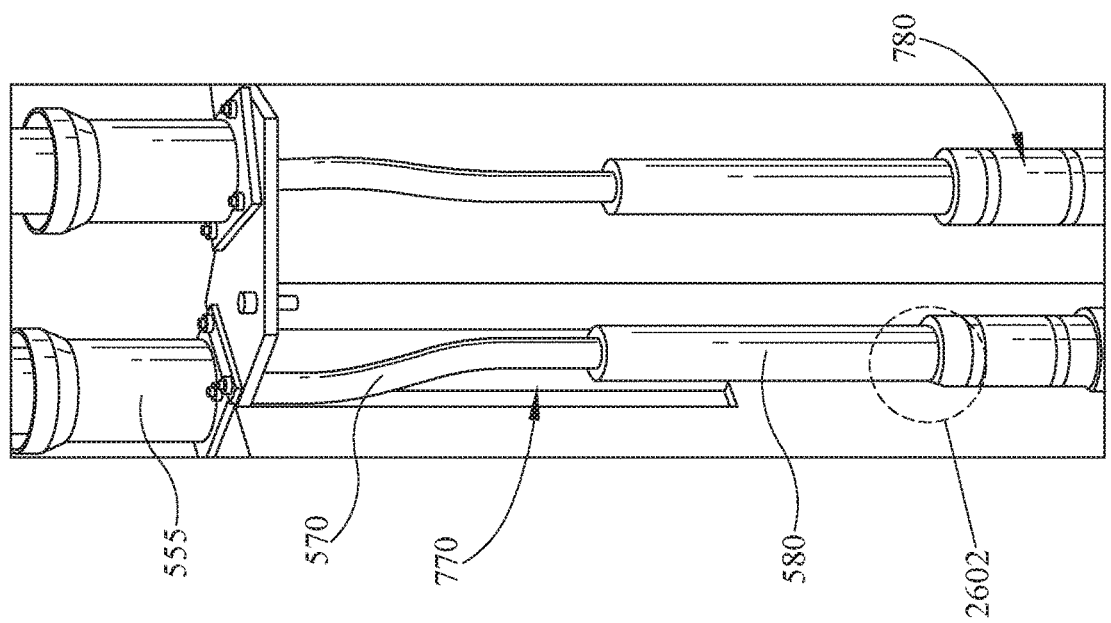
FIG. 19 provides a perspective, cross-section view of the stab plug subassembly within the tubing hanger in accordance with the first embodiment of the present invention.

With reference now also to FIG. 19, which provides a perspective, cross-section view of the stab plug subassembly 555, the interface between the tubing hanger penetrator module 700 and stab plug subassembly 555 can be seen in greater detail. The design of the boot seal 532 includes a positive retention feature to keep the contact 534 in place during mating and operation, however, the stab plug 530 does not function as a seal at the top of the tubing hanger 600. In order to mitigate water pooling on top 580 of the tubing hanger penetrator module 700, the cavity 770 below plug is to be filled with a substance more dense than water. Additionally, the materials comprising the upper portion 580 and tubing hanger penetrator seal assembly 780 are compatible with typical application fluids, further minimizing the risk of water pooling on top of the termination.

Figure 20:
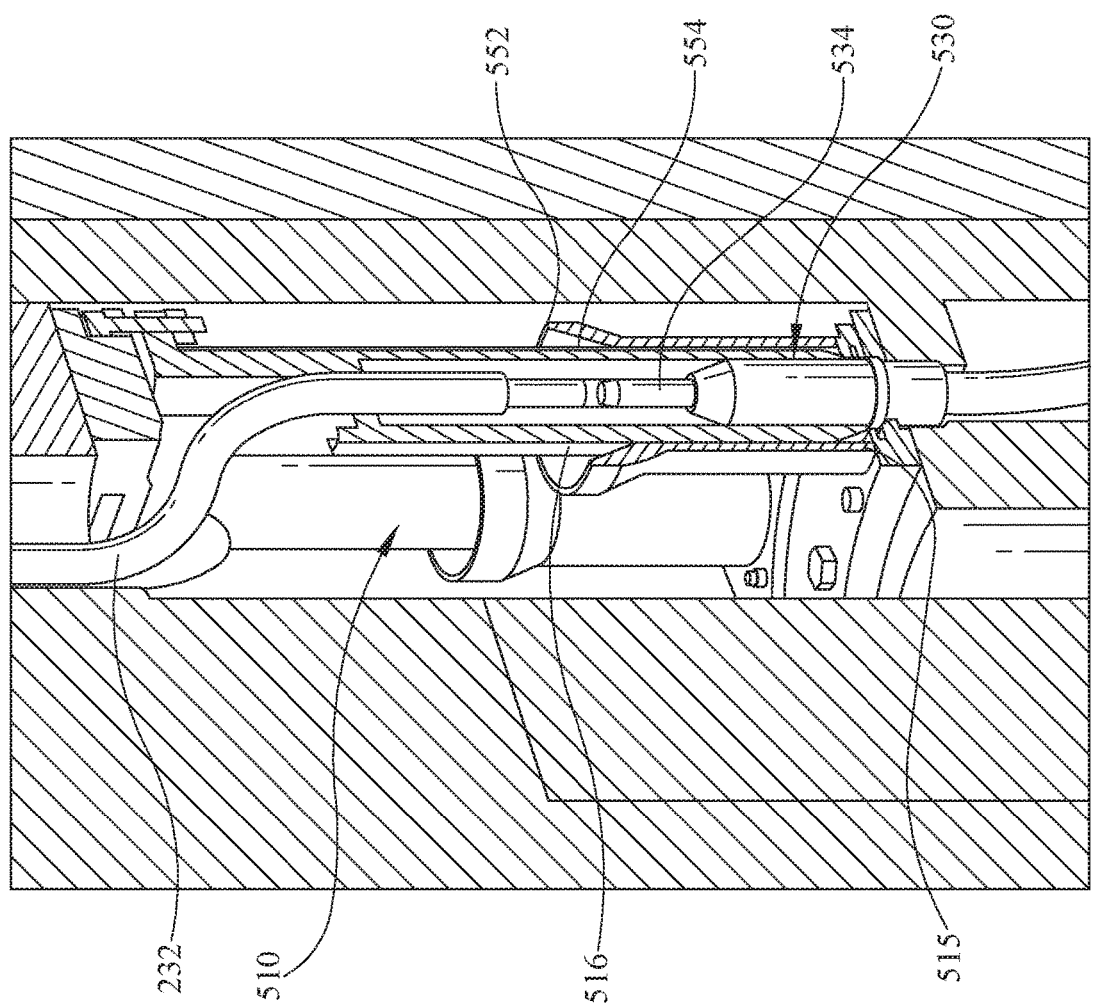
FIG. 20 provides a perspective, cross-section view of the interface between a stab receptacle and a stab plug in accordance with the first embodiment of the present invention.
Figure 21:
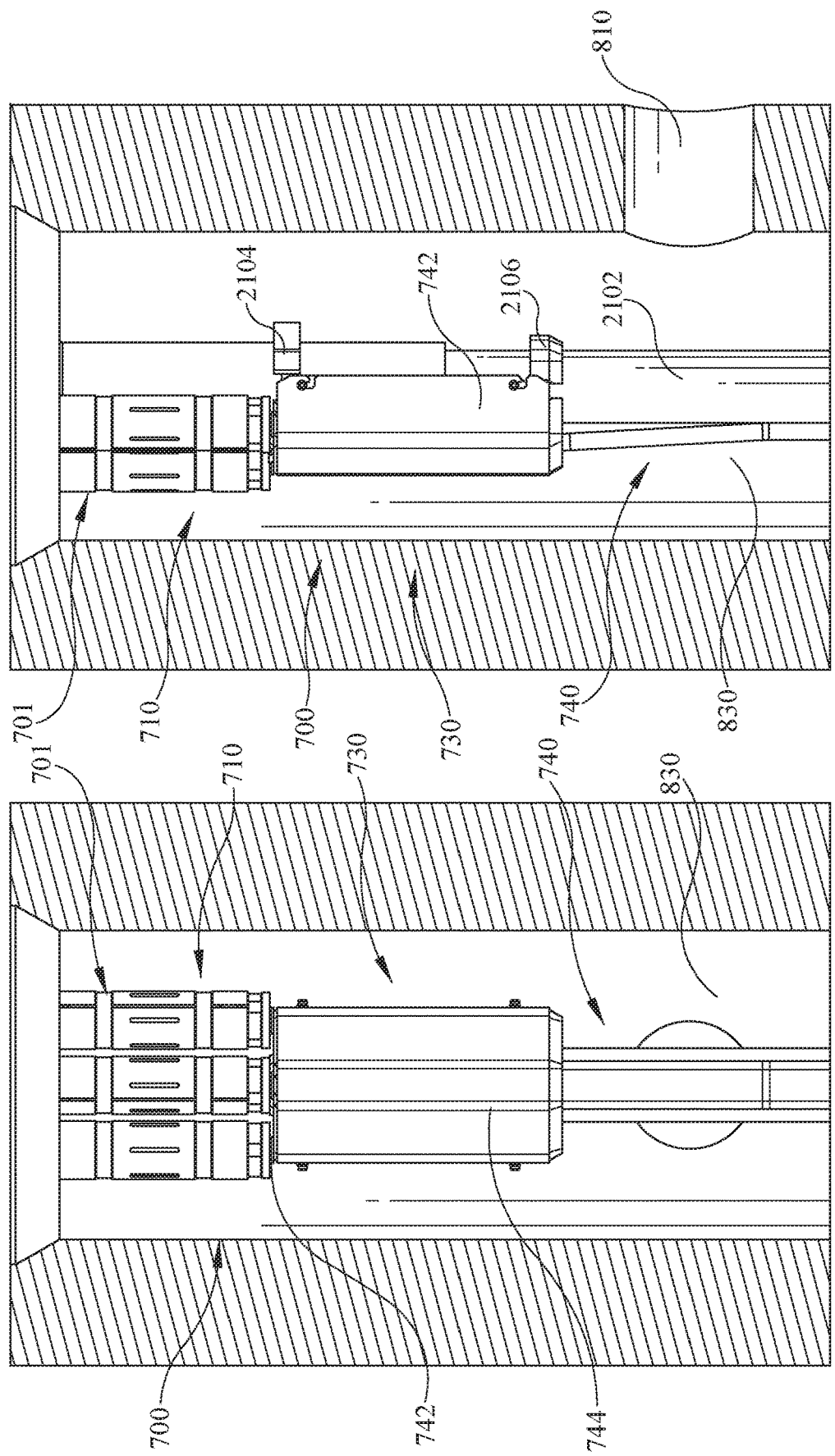
FIGS. 21A and 21B provide front (21A) and side (21B) views of an assembly comprising a tubing hanger penetrator, cable breakout, ESP cable, and casing in accordance with the first embodiment of the present invention.

With reference now to FIG. 20, a perspective, cross-section view of the interface between a stab receptacle 510 and a stab plug 530 is provided. The wellhead stab assembly 500 is a mating connector pair of stab receptacle 510 and stab plug 530 which provides an electrical interface between the secondary pressure containing body 400 and tubing hanger 600. The stab receptacle connector 510 mates as the secondary pressure containing body 400 is landed and relies on the installed position of the secondary pressure containing body 400 relative to the tubing hanger 600 to prevent the connector pair, stab receptacle 510 and stab plug 530, from separating. When mating, the exterior 516 of the stab receptacle 510 abuts the bottom 515 of the interior 554 of the guide funnel 550. The flared outer edge 552 of the guide funnel 550 aids in secure mating of the stab receptacle 510 with the stab plug 530. The pigtail 232 forms an electrical connection with the contact 534 when mated. The stab receptacle 510 is mounted to the secondary pressure containing body 400, and connects to the penetrator housing module 210A via the flexible pigtail/cable 232. The stab plug 530 is mounted to the top of the tubing hanger 600, and is terminated to a flexible cable pigtail 570 from the upper portion 580 of the tubing hanger penetrator module 700.

With reference now to FIGS. 21A and 21B, a front and side view respectively of a tubing hanger penetrator 710, termination housing 701, cable breakout box 730, ESP cable 740, disposed in the production bore 830 of the casing 800 are provided. The tubing hanger penetrator 710 with cable breakout box 730 provides pressure integrity and electrical continuity and integrity at the termination of ESP cable 740, and provides mechanical protection for the ESP cable 740 in the production bore 830 which has the polymeric sheath or galvanized armor removed. The assembly 700 is designed such that all major components are situated above the production outlet 810 to minimize interference with production flow and avoid exposure to turbulent flow due to the 90° turn at the production outlet. The breakout box 730 receives the individual cables 742 from the tubing hanger penetrators 710. The housing 744 of the breakout box 730 protects the ends 742 of the ESP cable 740 as they enter the termination housing 701 of the tubing hanger penetrators 710. The breakout box 730 is disposed on the shaft 2102 and is held in place by upper 2104 and lower 2016 securing mounts. The breakout box 730 may be landed or installed on the upper and lower securing mounts 2104 and 2016 after the mounts have been installed on the shaft 2102.

Figure 22:
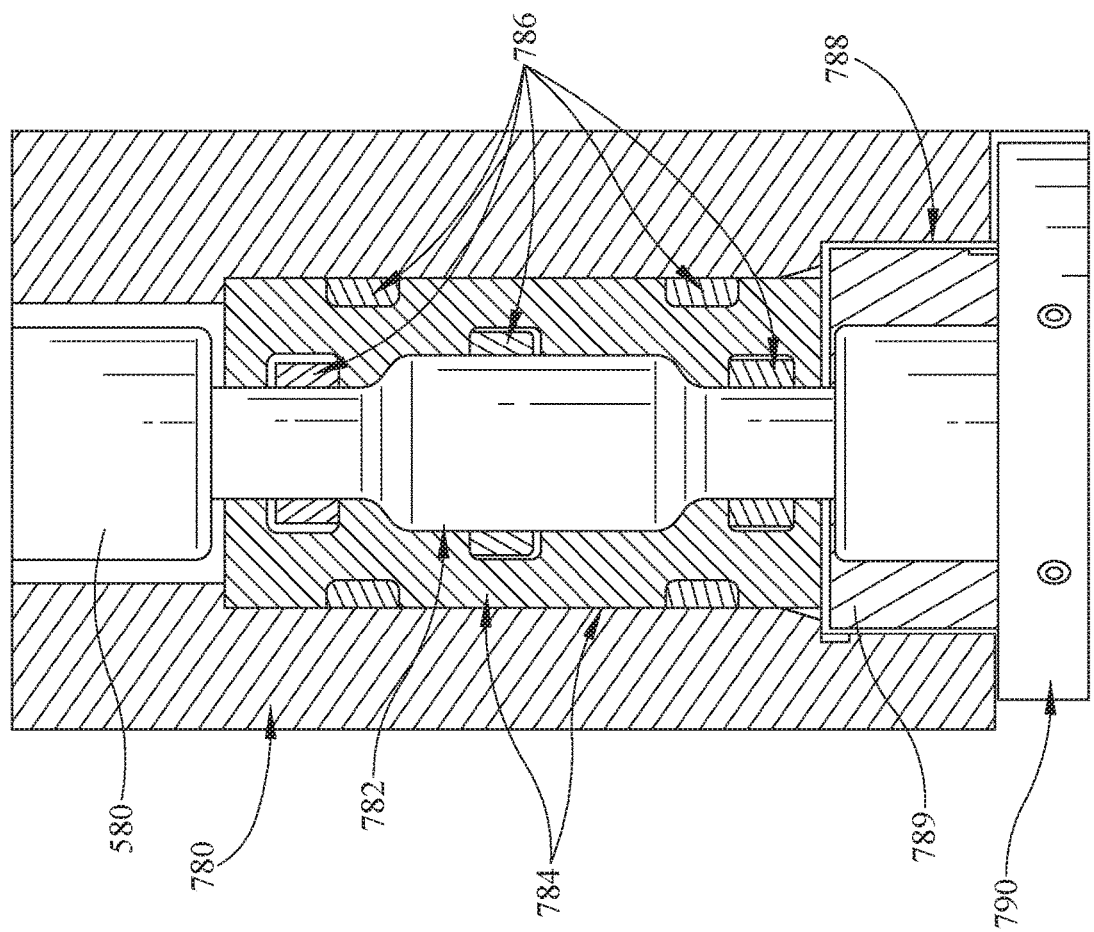
FIG. 22 provides a detailed, cross-section view of the pressure boundary of the tubing hanger penetrator module seal assembly in accordance with the first embodiment of the present invention.

With reference now to FIG. 22, a detailed, cross-section view of the pressure boundary 788 at the upper portion 790 of the tubing hanger penetrator module seal assembly 780 is provided. Pressure integrity between the production bore 830 and cavity 770 of the tubing hanger 600 is provided by the tubing hanger penetrator module seal assembly 780 at the primary pressure boundary 788. The tubing hanger penetrator module consists of two metallic shells 784, a thermoplastic penetrator 782 and elastomeric seals 786 with overmolded anti-extrusion springs. A threaded nut 789 provides mechanical retention for the penetrator module seal assembly 780. The seals 786 may be seals qualified per Norsk Sokkels Konkuranseposisjon ("NORSOK") M-710, ISO 10423, or other relevant industry standards. In one embodiment the seal 786 material is a fluorocarbon elastomer with an advertised temperature rating of <−20° C. to >+121° C., excellent RGD resistance and compatible for operating at pressures up to 15,000 psi. The tubing hanger penetrator module seal assembly 780 is located deep enough in the tubing hanger 600 as to be thermally isolated from the wellhead plug subassembly 700A in the event of any external fire or explosion. This provides for the use of conventional thermoplastic elements in the tubing hanger penetrator module seal assembly 780.

Figure 23:
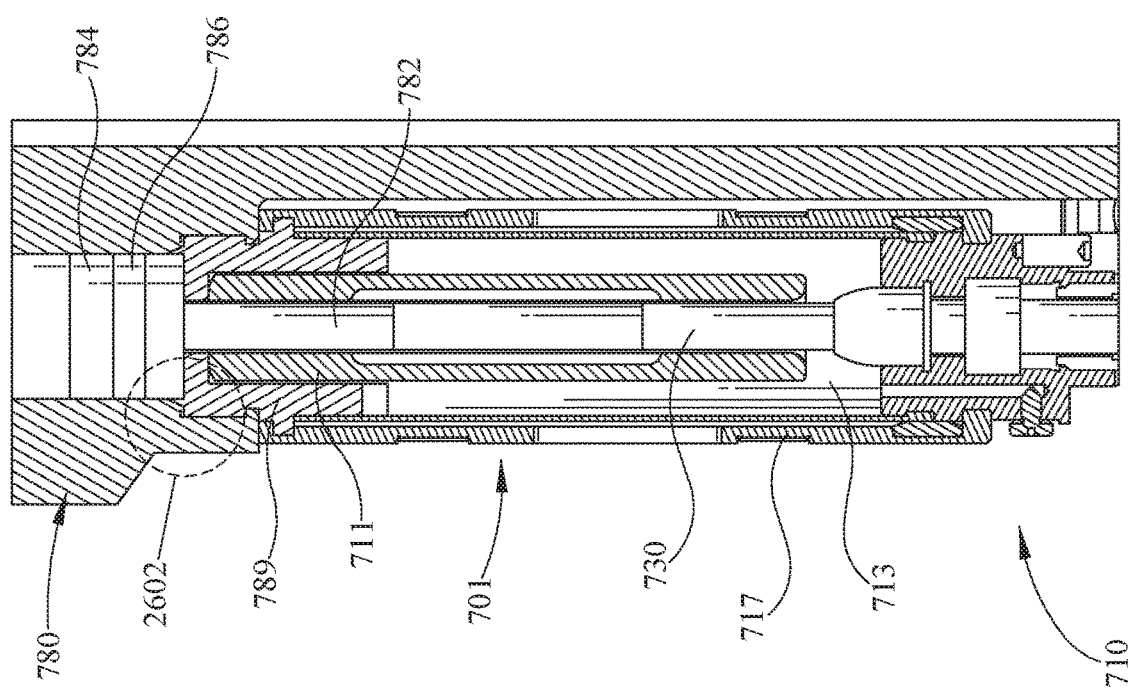
FIG. 23 provides a cross-section view of a pressure-balanced cable termination attached to the tubing hanger penetrator module and tubing hanger in accordance with the first embodiment of the present invention.

With reference now to FIG. 23, a cross-section view of a tubing hanger penetrator module seal assembly 780, tubing hanger penetrator 710, termination housing 701, and tubing hanger 600 is provided. The boots 580 and 711 on the penetrator pin 782 join the pigtail 570 with the ESP cable breakout 730. The ESP cable breakout 730 enters the bottom of the termination housing 701 and is joined in the termination volume 713 of the termination housing 701 of the tubing hanger penetrator 710 by the sealing boot 711. The penetrator pin 782 with metallic shells 784 and seals 786 form the pressure boundary between the tubing hanger 600 and the production bore 830. The termination volume 713 of the tubing hanger penetrator 710 that is enclosed by the outer shell or clamshell housing 717 may be filled with oil or an other suitable viscous fluid to maintain the integrity of the tubing hanger penetrator 710.

Figure 24:
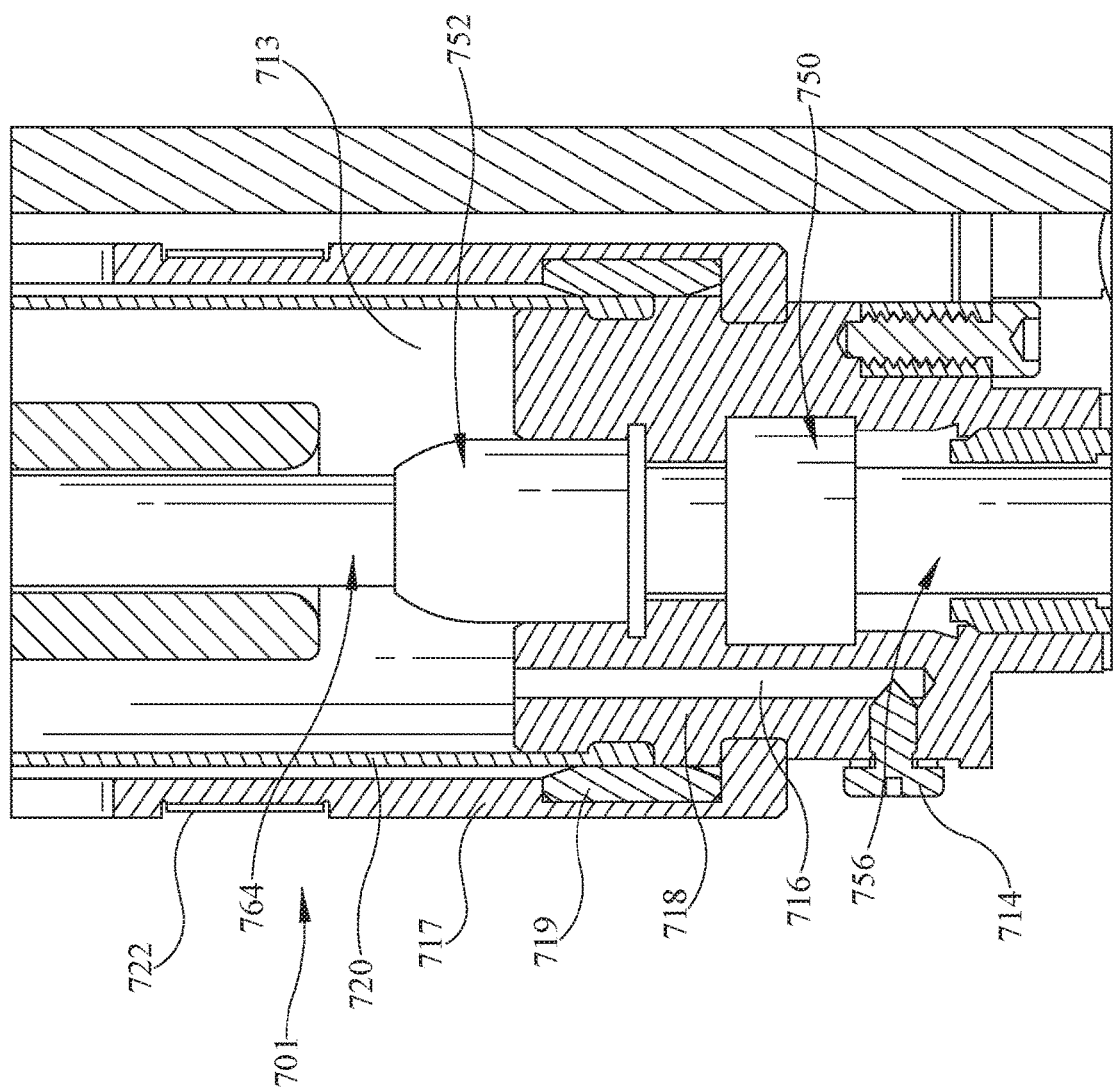
FIG. 24 provides a cross-section view of an ESP cable sealing configuration in accordance with the first embodiment of the present invention.

With reference now to FIG. 24, a cross-section view of an ESP cable sealing configuration is provided. The ESP cable 730 is sealed by two elastomeric components 750 and 752 at the entry to the termination volume 713. The first sealing element 750 is a gland seal, which prevents fluid ingress into the termination volume 713 along the outer sheath 754 of the cable. The second sealing element is a boot seal 752 which covers the end of the lead sheath 756, preventing fluid egress from the cable termination housing 701 of the tubing hanger penetrator 710 into the interstices between the layers of the ESP cable 730. A bolt 714 retains the fluid within the termination volume 713 of the termination housing 701 of the tubing hanger penetrator 710 and fluid may be added or removed from the volume 713 through the oil fill port 716. The outer wall of the clamshell housing 717 design is disposed around the termination housing end 718 of the termination housing 701 of the tubing hanger penetrator 710.

The termination housing end 718 of the tubing hanger penetrator module 700 is a clamshell design. The clamshell design eliminates small fasteners that could become loose during operation and fall into the production bore 830. Additional benefits of the clamshell design include easier installation of the termination housing 701, reduced height required for installation and independent alignment of the clamshell housing 717 relative to the thread form on the tubing hanger 600. This independence allows the oil fill port 716 to be readily accessible, regardless of the orientation of the thread in the tubing hanger 600.

The bladder 720 is sealed by a set of two sealing rings, such as sealing ring 719 at the bottom of the bladder 720, which are axially retained by the clamshell housing 717. The clamshell housing 717 is secured by a pair of cable bands 722.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A modular electrical connection system for pressure containment applications, the electrical connection system comprising:
 a stab receptacle assembly, the stab receptacle assembly comprising:
 a stab receptacle base;
 a compliance mount adapted to provide misalignment tolerance in at least one direction and disposed on the stab receptacle base;
 a set of stab receptacles, each stab receptacle in the set of stab receptacles being connected to a cable pigtail and being adapted to mate with a stab plug in a set of stab plugs; and
 a stab plug assembly disposed oppositely facing the set of stab receptacles, the stab plug assembly comprising the set of stab plugs and a set of conical guide funnels, the set of conical guide funnels adapted to guide the set of stab receptacles into a mating position with the set of stab plugs in part by a flared upper portion for each conical guide funnel in the set of conical guide funnels that protrudes beyond and is relatively larger than a substantially cylindrical lower portion;
wherein the set of stab receptacles are disposed on the compliance mount and facing the set of stab plugs for matingly connecting with the set of stab plugs, and wherein the compliance mount is adapted to compensate for a range of physical misalignment between the set of stab receptacles relative to the set of stab plugs to facilitate successful mating connection.

2. The electrical connection system of claim 1, further comprising:
a tubing hanger assembly comprising:
a tubing hanger disposed within a casing and adapted to form a pressure barrier at a production bore, the tubing hanger having an upper portion disposed above the production bore and a lower portion disposed within the production bore, the stab plug assembly disposed on the upper portion of the tubing hanger; and
a tubing hanger penetrator assembly comprising:
an electrical penetrator;
a tubing hanger penetrator sealing module disposed around the electrical penetrator and within the tubing hanger.

3. The electrical connection system of claim 2, further comprising:
a termination housing adapted to withstand temperatures and pressures in the production bore and disposed in the production bore and at the bottom of the tubing hanger, the termination housing having a top and a bottom and comprising:
a protective clamshell housing forming a termination volume about a sealing boot and a cable; and
a termination housing end disposed at the bottom of the termination housing, the termination housing end comprising a set of seals,
wherein the protective clamshell housing of the termination housing in combination with the set of seals isolates the electrical penetrator from the production bore.

4. The electrical connection system of claim 3, wherein the termination housing end is potted to secure and support a cable termination.

5. The electrical connection system of claim 3, wherein the set of seals comprises a gland seal and a boot seal.

6. The electrical connection system of claim 3, further comprising a set of cable bands disposed around the clamshell housing to secure the clamshell housing to the termination housing end.

7. The electrical connection system of claim 3, further comprising:
a bladder disposed within the clamshell housing and with the termination housing end forming a termination cavity for receiving oil;
an oil fill port formed in the termination end housing in fluid communication with the bladder and through which oil is delivered to the termination cavity for promoting the integrity of the termination housing.

8. The electrical connection system of claim 7, wherein the bladder is oil-filled to balance the pressure in the termination housing with the pressure of the production bore.

9. The electrical connection system of claim 3, wherein the sealing boot comprises a boot seal disposed within the clamshell housing and adapted to receive portions of the cable and the electrical penetrator within a cavity formed by the boot seal.

10. The electrical connection system of claim 3, further comprising:
a boot seal disposed intermediate the clamshell housing and the termination housing end to prevent fluid ingress from the termination housing into interstices formed in the cable.

11. A modular electrical connection system for wellhead applications, the electrical connection system comprising:
a tubing hanger assembly comprising:
a tubing hanger disposed within a completion tubing hanger and adapted to form a pressure barrier at a production bore, the tubing hanger having an upper portion disposed above the production bore and a lower portion disposed within the production bore;
a stab plug assembly disposed on the upper portion of the tubing hanger;
a tubing hanger penetrator assembly comprising:
an electrical penetrator;
a tubing hanger penetrator sealing module disposed around the electrical penetrator and within the tubing hanger;
a termination housing adapted to withstand temperatures and pressures in the production bore and disposed in the production bore and at the bottom of the tubing hanger, the termination housing having a top and a bottom and comprising:
a protective clamshell housing forming a termination volume about a sealing boot and a cable and adapted to withstand temperatures and pressures in the production bore;
a termination housing end disposed at the bottom of the termination housing, the termination housing end comprising a set of seals;
wherein the termination housing and the protective clamshell housing are matingly configured so that the protective clamshell housing may be received within the lower portion of the tubing hanger in a secure manner; and
wherein the protective clamshell housing of the termination housing in combination with the set of seals isolates the electrical penetrator from the production bore.

12. The electrical connection system of claim 11, wherein the termination housing end is potted to secure and support a cable termination.

13. The electrical connection system of claim 11, wherein the set of seals comprises a gland seal and a boot seal.

14. The electrical connection system of claim 11, further comprising a set of cable bands disposed around the clamshell housing to secure the clamshell housing to the termination housing end.

15. The electrical connection system of claim 11, further comprising:
a bladder disposed within the clamshell housing and with the termination housing end forming a termination cavity for receiving oil;
an oil fill port formed in the termination end housing in fluid communication with the bladder and through which oil is delivered to the termination cavity for promoting the integrity of the termination housing.

16. The electrical connection system of claim 15 wherein the bladder is oil-filled to balance the pressure in the termination housing with the pressure of the production bore.

17. The electrical connection system of claim 11, further comprising:
a boot seal disposed within the clamshell housing and adapted to receive within a cavity formed by the boot seal the cable and the electrical penetrator.

18. The electrical connection system of claim 11, further comprising:
a boot seal disposed intermediate the clamshell housing and the termination housing end to prevent fluid ingress from the termination housing into interstices formed in the cable.

19. The electrical connection system of claim 11, further comprising:
a stab receptacle assembly, the stab receptacle assembly comprising:
a stab receptacle base;
a compliance mount adapted to provide misalignment tolerance in at least one direction and disposed on the stab receptacle base;
a set of stab receptacles, each stab receptacle in the set of stab receptacles being connected to a cable pigtail and being adapted to mate with a stab plug in a set of stab plugs; and
a stab plug assembly disposed oppositely facing the set of stab receptacles, the stab plug assembly comprising the set of stab plugs and a set of conical guide funnels, the set of conical guide funnels adapted to guide the set of stab receptacles into a mating position with the set of stab plugs;
wherein the set of stab receptacles are disposed on the compliance mount and facing the set of stab plugs for matingly connecting with the set of stab plugs, and wherein the compliance mount is adapted to compensate for a range of physical misalignment between the set of stab receptacles and set of stab plug to facilitate successful mating connection.

* * * * *